US009893675B2

(12) United States Patent
Tachibana et al.

(10) Patent No.: US 9,893,675 B2
(45) Date of Patent: Feb. 13, 2018

(54) MOTOR CONTROL DEVICE AND IMAGE FORMING APPARATUS INCLUDING THE SAME

(71) Applicant: Konica Minolta, Inc., Chiyoda-ku, Tokyo (JP)

(72) Inventors: Yuta Tachibana, Toyokawa (JP); Katsuhide Sakai, Toyokawa (JP); Yasuhiro Koide, Toyohashi (JP); Yuhei Tatsumoto, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 49 days.

(21) Appl. No.: 15/009,021

(22) Filed: Jan. 28, 2016

(65) Prior Publication Data

US 2016/0226430 A1 Aug. 4, 2016

(30) Foreign Application Priority Data

Jan. 30, 2015 (JP) .................................. 2015-016763

(51) Int. Cl.
*H02P 29/60* (2016.01)
*H02P 7/00* (2016.01)
*G03G 15/00* (2006.01)
*H02P 29/032* (2016.01)

(52) U.S. Cl.
CPC ......... *H02P 29/60* (2016.02); *G03G 15/5004* (2013.01); *G03G 15/80* (2013.01); *H02P 29/032* (2016.02)

(58) Field of Classification Search
CPC ........ H02P 6/14; H02P 29/60; G03G 15/5016
USPC ................................. 318/471–473, 490, 565
See application file for complete search history.

(56) References Cited

U.S. PATENT DOCUMENTS

| 4,547,826 A * | 10/1985 | Premerlani ............ H02H 6/005 361/103 |
| 6,668,781 B1 | 12/2003 | Seils et al. |
| 7,248,009 B1 * | 7/2007 | Sundquist ............... H02P 29/64 318/432 |
| 7,504,796 B2 * | 3/2009 | Ichihara .................. H02P 27/04 318/471 |

(Continued)

FOREIGN PATENT DOCUMENTS

| JP | 2003079186 A | 3/2003 |
| JP | 2008012850 A | 1/2008 |
| JP | 2012029457 A | 2/2012 |

OTHER PUBLICATIONS

JPO, Notification of Reasons for Refusal corresponding to Application No. 2015-016763; dated Apr. 4, 2017.

*Primary Examiner* — Bentsu Ro
(74) *Attorney, Agent, or Firm* — Cantor Colburn LLP

(57) ABSTRACT

In a device for controlling a motor mounted on a system with different operation modes, a controller unit calculates an input value for the motor based on an output value of the motor and a target value depending on operation modes of the system, and instructs a driver circuit of the motor to apply the input value to the motor. An estimation unit estimates an amount of rise in temperature of the motor by applying the input value for the motor to a thermal model of the motor. A notification unit compares a value estimated by the estimation unit with a threshold value. When the estimated value exceeds the threshold value, the notification unit sends a request for change of operation mode to the system.

12 Claims, 14 Drawing Sheets

(56) References Cited

U.S. PATENT DOCUMENTS

2015/0048772 A1\* 2/2015 Nagata .................. G05B 6/02
318/634

\* cited by examiner

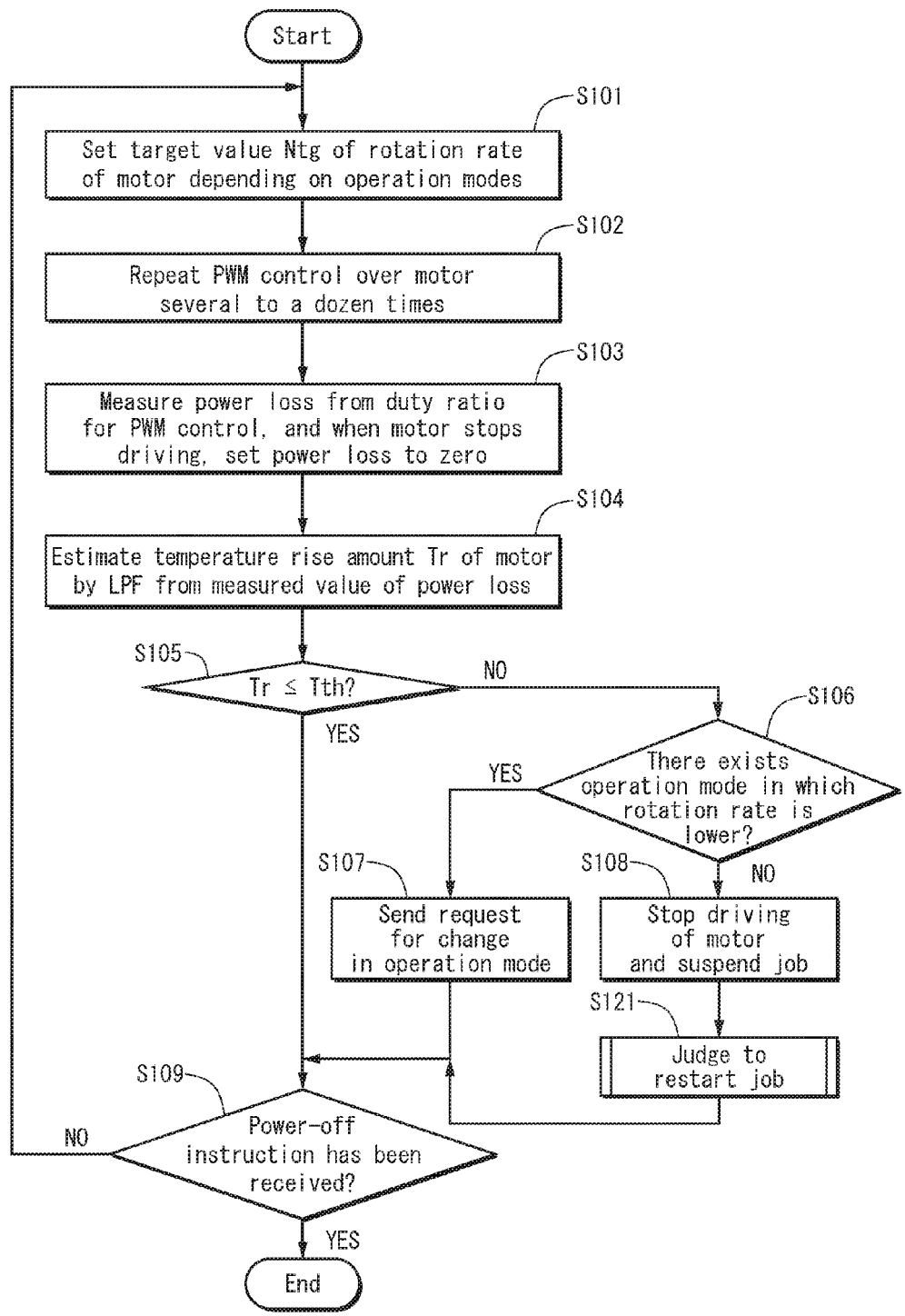

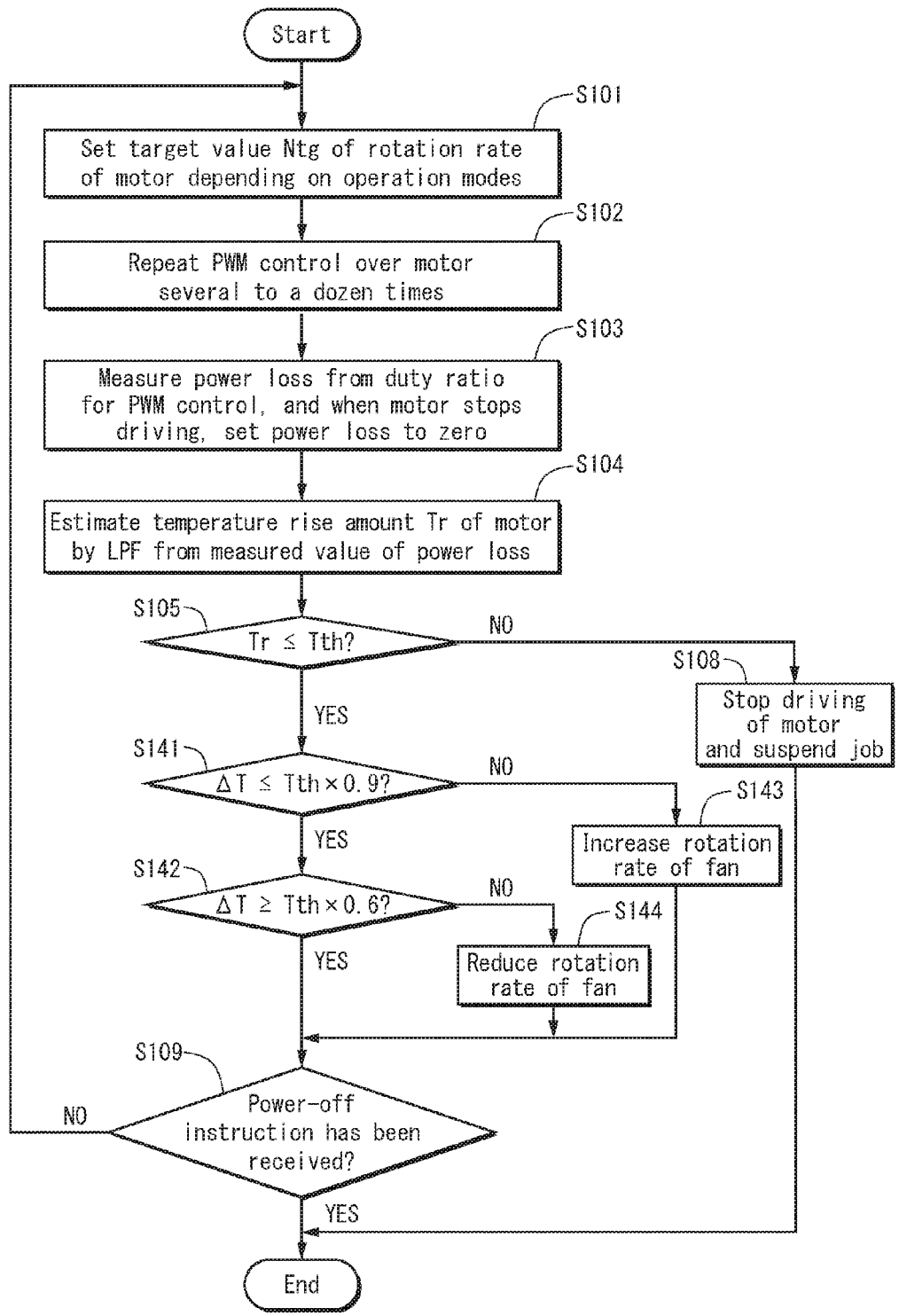

MOTOR CONTROL DEVICE AND IMAGE FORMING APPARATUS INCLUDING THE SAME

CROSS REFERENCE TO RELATED APPLICATIONS

The present invention claims priority under 35 U.S.C. § 119 to Japanese Application No. 2015-016763 filed Jan. 30, 2015, the entire content of which is incorporated herein by reference.

BACKGROUND OF THE INVENTION

Field of the Invention

The present invention relates to technologies of controlling motors, and in particular, those used in image forming apparatuses.

Background

Electrophotographic image forming apparatuses such as laser printers use motors to actuate a variety of movable members. For example, such an apparatus rotates conveyance rollers to carry a sheet within the apparatus; the apparatus rotates a photoreceptor drum to allow its circumference surface to undergo steps of an image forming process, such as electrostatic charge, exposure, developing, transfer, and cleaning, in turn; the apparatus rotates a developing roller to allow its circumference surface to attract toner particles and then make them adhere onto a photoreceptor drum; the apparatus rotates an intermediate transfer belt to allow its surface to receive a toner image from a photoreceptor drum and then transfer it onto a sheet.

For recent image forming apparatuses, there has been developed a technology of separating from motors their driver circuits, esp. their controller circuits, more specifically pre-driver integrated circuits, and of integrating them with the controller circuits of the apparatuses. This technology prevents such a motor from overheating as follows.

Since separated from the motor, its controller circuit cannot detect an actual amount of rise in temperature of the motor, i.e., a difference in temperature between the motor and its surroundings. The controller circuit also cannot measure an amount of electric current of the motor if the circuit has no new sensor. The controller circuit thus, in order to prevent the motor from overheating with conventional configuration, estimates an amount of rise in temperature of the motor from the input value therefor. For example, a controller circuit disclosed in JP 2008-012850 estimates an amount of rise in temperature of a motor from the number of times that a duty ratio for pulse width modulation (PWM) control, i.e., a proportion of a pulse width to a period of pulse current or pulse voltage applied to the motor, exceeds a threshold value. Another controller circuit disclosed in JP 2003-079186 estimates an amount of heat generated by a motor from an amount of current of the motor. Either of these controller circuits, when having found a risk of overheating a motor from an estimated amount of temperature rise or heat generation of the motor, reduces rotation rates of the motor or enlarges time intervals of driving the motor. In addition, the controller circuit communicates and cooperates with the controller circuit of the apparatus to synchronize action of an object that the motor should drive with action of other movable members. The controller circuit thus, without overheating the motor, allows the apparatus to continue to process a job.

This technology, as discussed above, never forces to cut off power supply to a motor, even when having found a risk of overheating the motor, in contrast to overheat protection circuits embedded into general controller circuits. Accordingly, the motor is never subjected to any sudden braking force, and thus, any movable member that the motor should drive, such as a conveyance roller or a photoreceptor drum, is never forced to abruptly stop moving. The technology therefore prevents the overheat protection from jamming sheets and damaging surfaces of photoreceptor drums and the like.

SUMMARY OF THE INVENTION

In order to more reliably prevent motors from overheating, the technology of integrating the controller circuits of the motors with the controller circuit of the apparatus has to enhance the accuracy of estimating an amount of rise in temperature of the motors. This is, however, difficult for the following reasons.

Like the technology disclosed in JP 2008-012850, the technology of estimating an amount of rise in temperature of a motor from the number of times that a duty ratio for PWM control exceeds a threshold value involves neither an amount of heat dissipated from the motor kept at rest nor an amount of heat stored in the motor restarting to operate. When two or more jobs are processed intermittently, it is thus difficult to estimate amounts of rise in temperature of the motor accurately throughout the time period when these jobs are processed.

Like the technology disclosed in JP 2003-079186, the technology of tabulating the relationship in amount between current flowing in and heat generated out of a motor, and of using the table to estimate an amount of rise in temperature of the motor has a limit to the variety of load fluctuations that can be tabulated. It is thus difficult for the technology to deal with every load fluctuation.

An object of the present invention is to solve the above-discussed technical problems, and in particular, to provide a motor control device that can enhance the accuracy of estimating an amount of rise in temperature of a motor regardless of repetition of intermittent drive of the motor and a variety of load fluctuations.

A device according to one aspect of the present invention is a device for controlling a motor mounted on a system with different operation modes. The device comprises a controller unit configured to calculate an input value for the motor based on an output value of the motor and a target value depending on operation modes of the system, and to instruct a driver circuit of the motor to apply the input value to the motor; an estimation unit configured to estimate an amount of rise in temperature of the motor by applying the input value for the motor to a thermal model of the motor; and a notification unit configured to compare a value estimated by the estimation unit with a threshold value, and when the estimated value exceeds the threshold value, to send a request for change of operation mode to the system.

An image forming apparatus according to one aspect of the present invention is an apparatus for, while transferring a sheet, forming an image on the sheet. The apparatus comprises a main controller unit configured to assign an operation mode depending on a job received from a user; two or more motors configured to be used in transferring the sheet and forming the image on the sheet; two or more driver circuits configured to supply power to respective motors of the two or more motors; and a motor control unit including: a controller unit configured to calculate input values for the two or more motors based on output values of the two or more motors and target values depending on operation modes of the image forming apparatus, and to instruct the two or more driver circuits to apply the input values to the respective motors; an estimation unit configured to estimate amounts of rise in temperature of the two or more motors by applying the input values for the two or more motors to a thermal model of the two or more motors; and a notification unit configured to compare a value estimated by the estimation unit with a threshold value, and when the estimated value exceeds the threshold value, to send a request for change of operation mode to the main controller unit.

BRIEF DESCRIPTION OF THE DRAWINGS

These and other objects, advantages, and features of the invention will become apparent from the following description thereof taken in conjunction with the accompanying drawings which illustrate a specific embodiment of the invention.

In the drawings:

FIG. 12 is a flow chart of motor control according to embodiment 6 of the present invention;

FIG. 14 is a flow chart of motor control according to embodiment 7 of the present invention.

DETAILED DESCRIPTION

The following describes embodiments of the present invention with reference to the drawings.

Embodiment 1

Overview of Configuration of Image Forming Apparatus

Figure 1:
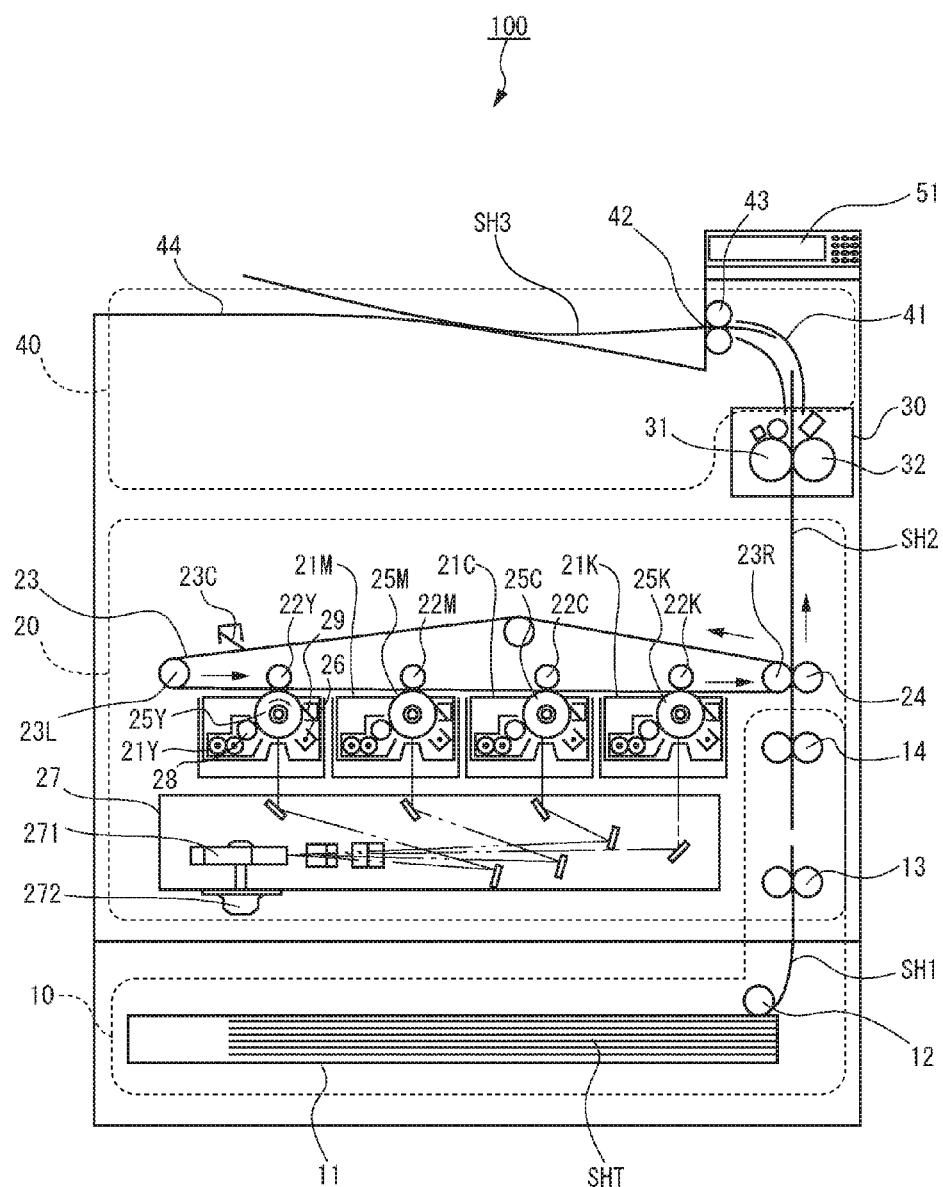
FIG. 1 is a schematic frontal view illustrating the configuration of an image forming apparatus according to embodiment 1 of the present invention.

FIG. 1 is a schematic frontal view illustrating the configuration of an image forming apparatus according to embodiment 1 of the present invention. This image forming apparatus 100 is a color laser printer. Elements inside the printer 100 are illustrated in FIG. 1 as if they were viewable through the front surface of a housing of the printer 100. Referring to FIG. 1, the printer 100 includes a feeding unit 10, an imaging unit 20, a fixing unit 30, and an output unit 40. These elements 10-40 constitute an image forming assembly of the printer 100.

Feeding Unit

The feeding unit 10 rotates conveyance rollers 12, 13, and 14, which are disposed along a sheet conveyance path from a feeding cassette 11 to the imaging unit 20, to feed sheets SHT piece by piece from the feeding cassette 11 to the imaging unit 20. The "sheets" indicate a thin and film-like or plate-like material or product, such as paper and film resin. The sheets SHT that can be housed in the feeding cassette 11 are plain papers, wood-free papers, color copier papers or coated papers, and have the size of A3, A4, A5, or B4. The timing roller 14, which is disposed the closest to the imaging unit 20 among the conveyance rollers, generally stops rotating even while a job is processed, and rotates in response to a driving signal from a main controller unit which is described later. In accordance with a timing indicated by the driving signal, the timing roller 14 sends a sheet SH2 to the imaging unit 20.

Imaging Unit

The imaging unit 20 forms a toner image on the sheet SH2 fed by the feeding unit 10.

More specifically, each of four creation units 21Y, 21M, 21C, and 21K first causes a surface of a corresponding one of the photoreceptor drums 25Y, 25M, 25C, and 25K to face a corresponding charger 26 while rotating the photoreceptor drum. This allows the facing portions of the photoreceptor drums to be uniformly charged.

Each of the creation units 21Y, . . . next irradiates the charged portion of a corresponding one of the photoreceptor drums 25Y, . . . with laser light emitted by an exposure unit 27. The exposure unit 27 rotates a polygon mirror 271 by a motor 272 to scan the respective surfaces of the photoreceptor drums 25Y, . . . with the laser light. At this time, the exposure unit 27 modulates an amount of the laser light based on tone values of colors of yellow (Y), magenta (M), cyan (C), and black (K) represented by image data. As a result, an electrostatic latent image representing an image of each of the colors is generated on the surface of a corresponding one of the photoreceptor drums 25Y, . . . .

Then, each of the creation units 21Y, . . . rotates a corresponding developing roller 28 to cover the surface of the developing roller 28 with toner particles of a corresponding one of the Y, M, C, and K colors and bring the surface of the developing roller 28 into contact with the surface of a corresponding one of the photoreceptor drums 25Y, . . . .

As a result, the electrostatic latent image on each of the respective surfaces of the photoreceptor drums 25Y, . . . is developed by toner particles of a corresponding color. In this way, each of respective images of the four colors represented by the image data is reproduced on the surface of a corresponding one of the four photoreceptor drums 25Y, . . . , as a toner image of a corresponding color.

The imaging unit 20 rotates primary transfer rollers 22Y, 22M, 22C, and 22K and driving rollers 23L and 23R to rotate an intermediate transfer belt 23, and thus to bring the surface of the intermediate transfer belt 23 into contact with the four photoreceptor drums 25Y, . . . . At this time, the respective toner images of the four colors on the surfaces of the photoreceptor drums 25Y, . . . are transferred onto the same position on the surface of the intermediate transfer belt 23 in turn from the surface of the photoreceptor drums 25Y, . . . , by the action of an electric field generated between each of the primary transfer rollers 22Y, . . . and a corresponding one of the photoreceptor drums 25Y, . . . . As a result, a single color toner image is formed on the position.

The imaging unit 20 further rotates a secondary transfer roller 24 in accordance with the driving roller 23R to bring the surface of the intermediate transfer belt 23 into contact with the sheet SH2, which passes through a nip between the driving roller 23R and the secondary transfer roller 24. At this time, the color toner image on the intermediate transfer belt 23 is transferred onto the surface of the sheet SH2 by the action of an electric field generated between the intermediate transfer belt 23 and the secondary transfer roller 24. Then, the imaging unit 20 rotates the secondary transfer roller 24 to send the sheet SH2 to the fixing unit 30.

Also, the imaging unit 20 uses drum cleaners 29 and a belt cleaner 23C to remove toner particles remaining even after the transfer from the respective surfaces of the photoreceptor drums 25Y, . . . and the intermediate transfer belt 23. The drum cleaners 29 are each a blade or a brush that is disposed between each of the primary transfer rollers 22Y, . . . and the corresponding charger 26. Immediately after each of the photoreceptor drums 25Y, . . . contacts the intermediate transfer belt 23, a corresponding one of the drum cleaners 29 contacts a surface portion of the photoreceptor drum to scrape toner particles from the surface portion. The belt cleaner 23C is a blade or a brush that is disposed on the upstream side with respect to the four creation units 21Y, . . . in the rotation direction of the intermediate transfer belt 23. After the intermediate transfer belt 23 contacts the secondary transfer roller 24, the belt cleaner 23 contacts a surface portion of the intermediate transfer belt 23 to scrape toner particles from the surface portion.

Fixing Unit

The fixing unit 30 thermally fixes the toner image on the sheet SH2, which is sent from the imaging unit 20. More specifically, the fixing unit 30 rotates a fixing roller 31 and a pressure roller 32 to cause the sheet SH2 pass through a nip therebetween. At this time, the fixing roller 31 applies heat of a heater included therein to the surface of the sheet SH2, and the pressure roller 32 applies pressure to the heated portion of the surface of the sheet SH2 to press the heated portion against the fixing roller 31. The toner image is fixed onto the surface of the sheet SH2 by the action of the heat applied by the fixing roller 31 and the pressure applied by the pressure roller 32. Further, the fixing unit 30 rotates the fixing roller 31 and the pressure roller 32 to send the sheet SH2 to an output unit 40.

Output Unit

The output unit 40 outputs a sheet SH3, onto which the toner image is fixed, to the outside of the housing of the printer 100. More specifically, the sheet SH3 moves along a guide plate 41 from an upper portion of the fixing unit 30 toward an outlet 42 that is provided in the housing of the printer 100. At this time, the output unit 40 rotates an output roller 43, which is disposed inside the outlet 42, to send out the sheet SH3 to the outside of the outlet 42 by using the circumferential surface of the output roller 43. This allows the sheet SH3 to be housed in an output tray 44 that is included in the upper surface of the printer 100.

Electronic Control System of Image Forming Apparatus

Figure 2:
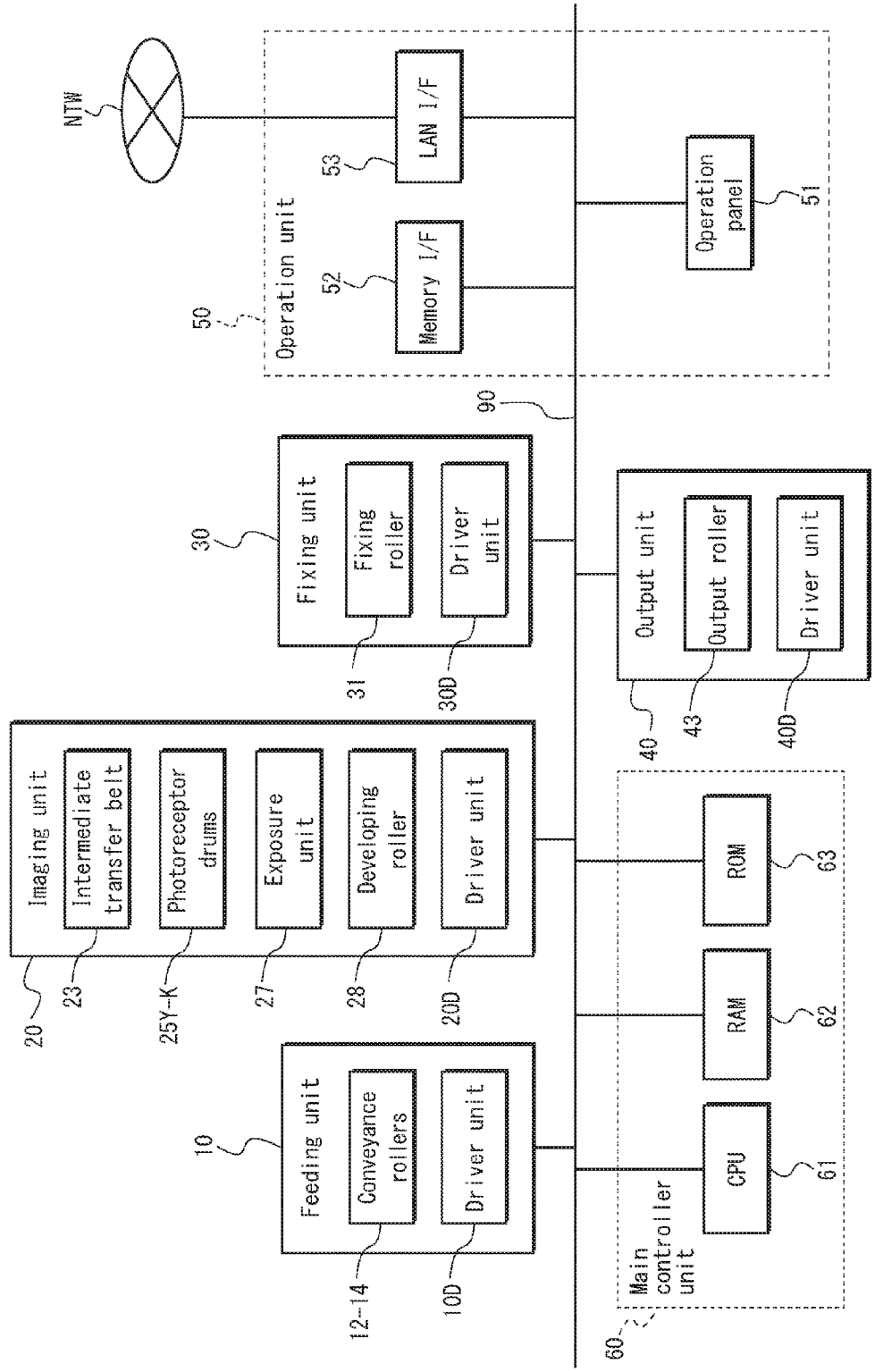
FIG. 2 is a block diagram of the control system included in the image forming apparatus illustrated in FIG. 1.

FIG. 2 is a block diagram of the configuration of the electronic control system of the printer 100. In this electronic control system, referring to FIG. 2, an operation unit 50 and a main controller unit 60, as well as the elements 10-40 of the image forming unit, are communicatively connected to one another via a bus 90.

Operation Unit

The operation unit 50 receives a job request and data that is a processing target such as an image via a user's operation or communication with an external electronic device, and sends them to the main controller unit 60. Referring to FIG. 2, the operation unit 50 includes an operation panel 51, a memory interface (I/F) 52, and a network (LAN) I/F 53. The operation panel 51 includes push-buttons, a touch panel, and a display. The operation panel 51 displays, on the display, a GUI screen such as an operation screen and an input screen for various parameters. The operation panel 51 identifies a push-bottom or a position on the touch panel that the user has operated, and sends information relevant to the identification as operation information to the main controller unit 60. The memory I/F 52 includes a USB port or a memory card slot, and acquires data that is a processing target directly from an external storage device such as a USB memory and a hard disk drive (HDD) via the USB port or the memory card slot. The LAN I/F 53 has a wired or wireless connection to an external network NTW, and receives data that is a processing target from other electronic device that is connected to the network NTW.

Main Controller Unit

The main controller unit 60 is an electronic circuit mounted on a single board built in the printer 100. Referring to FIG. 2, the main controller unit 60 includes a CPU 61, a RAM 62, and a ROM 63. The CPU 61 controls other elements 10, 20, . . . , which are connected to the bus 90, in accordance with firmware. The RAM 62 provides the CPU 61 with a work area for the CPU 61 to execute the firmware, and stores therein data that is a processing target, which is received by the operation unit 50. The ROM 63 includes a non-rewritable semiconductor memory device, and further includes a rewritable semiconductor memory device such as an EEPROM, or an HDD. The former stores therein the firmware, and the latter provides the CPU 61 with a storage area for environmental variables and the like.

The main controller unit 60 first controls, by the CPU 61 executing various types of firmware, the other elements included in the printer 100 based on the operation information received from the operation unit 50. More specifically, the main controller unit 60 causes the operation unit 50 to display the operation screen to receive the user's operation. In accordance with this operation, the main controller unit 60 determines an operation mode such as a running mode, a standby mode, and a sleep mode, and notifies the other elements of the determined operation mode by sending a driving signal to them, thus causing them to perform processing according to the operation mode.

For example, when the operation unit 50 receives a print job from the user, the main controller unit 60 first causes the operation unit 50 to transfer image data that is a print target to the RAM 62. Next, in accordance with a print condition indicated by the print job, the main controller unit 60 sends a designation of the type of sheets to be fed and its feeding timing to the feeding unit 10, provides the imaging unit 20 with image data representing a toner image to be formed, and sends a designation of the surface temperature of the fixing roller 31 to be maintained to the fixing unit 30.

Control System of Motor

Further referring to FIG. 2, the elements 10, 20, 30, and 40 of the image forming unit include their respective driver units 10D, 20D, 30D, and 40D for controlling motors that drive movable members to be used by the elements, such as the conveyance rollers 12-14, intermediate transfer belt 23, photoreceptor drums 25Y, . . . , developing rollers 28, fixing roller 31, and output roller 43.

Figure 3:
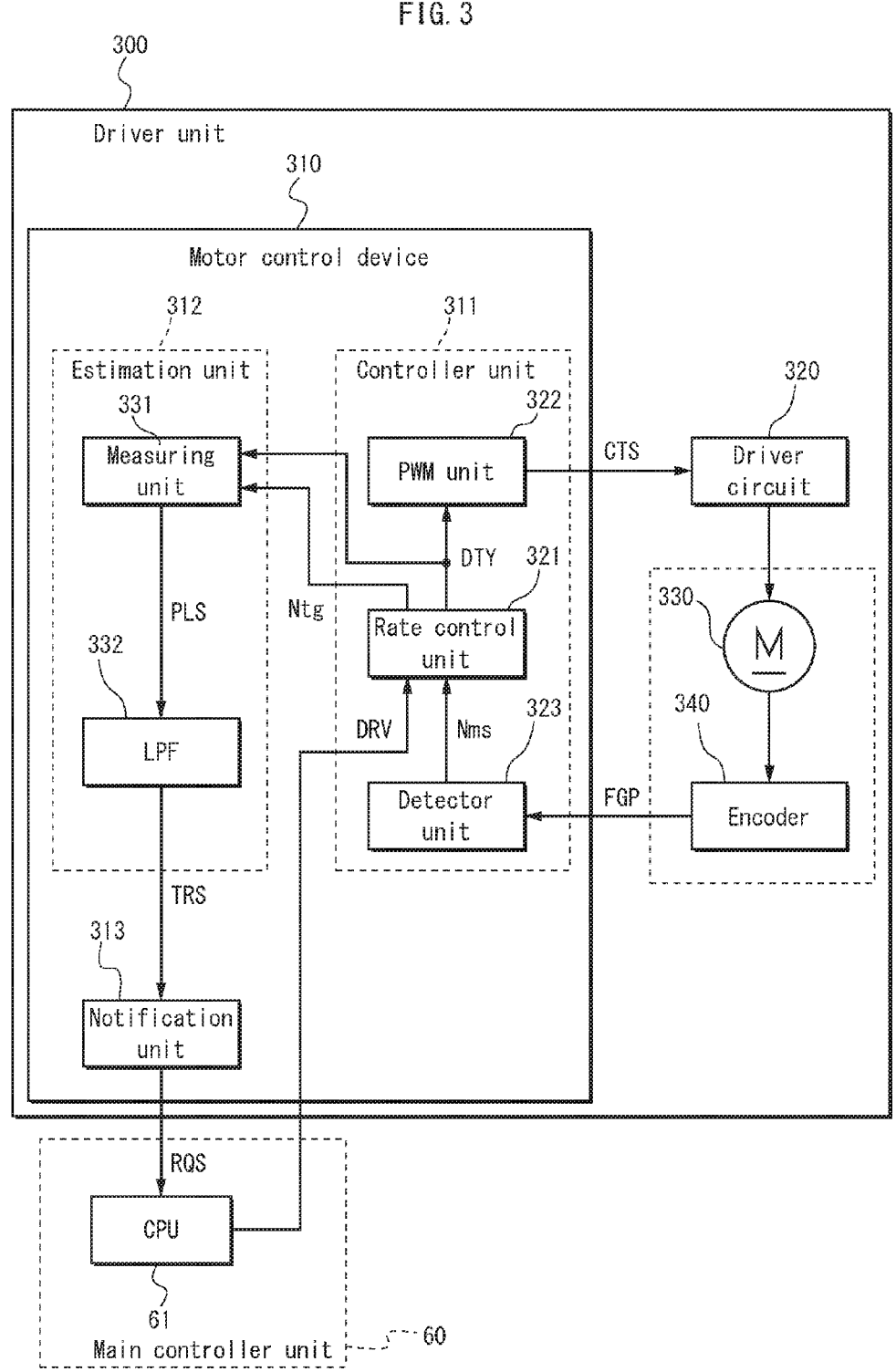
FIG. 3 is a block diagram of the configuration common among the driver units illustrated in FIG. 2.

FIG. 3 is a block diagram of the configuration 300 common among the driver units 10D-40D. Referring to FIG. 3, this configuration 300 includes a motor control device 310, a driver circuit 320, a motor 330, and an encoder 340. Among these elements, ones 320, 330, and 340 other than the motor control device 310 are provided for each motor.

The motor control device 310 is one or more electronic circuits that are mounted on a single board built in the printer 100, such as application specific integrated circuits (ASIC) or field programmable gate arrays (FPGA). The motor control device 310 communicates with the main controller unit 60 or the motor control device of another driver unit 10D, . . . , or 40D through the bus 90 shown in FIG. 2. The motor control device 310 is preferably integrated on the same board as the main controller unit 60 is. The motor control device 310 uses target and actual rotation numbers or rates of the motor 330 to calculate an average level of voltage to be applied to the motor 330. The motor control device 310 further uses this level to perform PWM control over the driver circuit 320.

The driver circuit 320 is an inverter with one or more switching devices such as power transistors (FET), and uses direct voltage received from the power supply unit of the printer, which is not shown in figures, to apply pulse voltages to the motor 330. The driver circuit 320, in particular, in response to a control signal CTS from the motor control device 310, turns the switching devices on and off to change the widths of the pulse voltages. The average level of the voltage applied to the motor 330 thus equals the value calculated by the motor control device 310.

The motor 330 is a brushless direct-current (BLDC) motor that can rotate forward and reverse in general. The encoder 340 is of an optical or magnetic type and mounted on the body of the motor 330. The encoder 340 generates an alternate-current signal FGP of a frequency depending on an actual rotation number of the motor 330, and sends the signal to the motor control device 310.

Further referring to FIG. 3, the motor control device 310 includes a controller unit 311, estimation unit 312, and notification unit 313. These functional units 311-313 are embedded into an electronic circuit such as ASIC and FPGA as dedicated hardware.

Controller Unit

The controller unit 311 uses output values of the motor 330 to perform a feedback control for calculating input values of the motor 330 to be instructed to the driver circuit 320. As the output values of the motor 330, its rotation numbers are used, and as its input values, the average levels of the voltage to be applied to the motor 330 are used. Referring to FIG. 3, the controller unit 311 includes a rate control unit 321, PWM unit 322, and detector unit 323.

The rate control unit 321 uses the difference between measured and target values of the rotation rates of the motor 330 to calculate the input values of the motor 330. More specifically, the rate control unit 321 first sets the rotation number of the motor 330 to a target value, Ntg, different according to the operation mode indicated by a driving signal DRV from the main controller unit 60. The rate control unit 321 next uses the difference between the target value Ntg and a measured value, Nms, of the rotation number of the motor 330 to calculate a voltage instruction DTY. The voltage instruction DTY specifies an average level of the voltage to be applied to the motor 330 as a duty ratio for the PWM control. In other words, the duty ratio, d, that the voltage instruction DTY indicates is equal to the ratio to the power supply voltage, Vcc, of average pulse voltage, Vav, per cycle applied to the motor 330: d=Vav/Vcc.

The PWM unit 322 uses the input values of the motor 330 calculated by the rate control unit 321 to perform the PWM control over the driving circuit 320. More specifically, the PWM unit 322 sends the control signal CTS to the driving circuit 320 to instruct when to turn the switching devices on and off. The PWM unit 322 thus makes the driving circuit 320 adjust the duty ratio of pulse voltage to the value d that the voltage instruction DTY indicates. The pulse voltage is to be applied to the motor 330, i.e. the pulse width represented by the ratio to one cycle.

The detector unit 323 monitors the output signal FGP of the encoder 340 to measure from the frequency of the signal the rotation number of the motor 330. The detector unit 323 feeds back the measured value Nms to cause the rate control unit 321 to calculate the voltage instruction DTY.

Estimation Unit

The estimation unit 312 uses a thermal model of the motor 330 to estimate amounts of rise in temperature of the motor 330 from its input values. The "amount of rise in temperature" or "temperature rise amount" of a motor means the difference between the temperature of the coils of the motor or of the switching devices of the driving circuit of the motor and the ambient air temperature of the motor or its driving circuit.

Referring to FIG. 3, the estimation unit 312 includes a measuring unit 331 and a low-pass filter (LPF) 332. The measuring unit 331 measures a power loss of the motor 330 from the duty ratio that the voltage instruction DTY indicates. The measured value PLS is entered to the LPF 332. When detecting, from the driving signal DRV received from the main controller unit 60, that the duty ratio is equal to zero or the motor 330 is stopping, the measuring unit 331 sets the measured value PLS to zero. The LPF 332 is a first-order lag system with a digital filter, in particular, an infinite impulse response (IIR) one, which represents a thermal model of the motor 330. The "thermal model" of a motor means the formula that represents change in temperature of the motor caused by thermal exchange between the motor and its surroundings by using parameters that characterize the thermal exchange, such as thermal capacitance and resistance. The LPF 332 next uses the thermal model to integrate the values PLS of power loss of the motor 330 measured by the measuring unit 331, thus estimating an amount of rise in temperature of the motor 330. The estimated amount TRS is sent to the notification unit 313.

Notification Unit

The notification unit 313, whenever receiving from the estimation unit 312 the estimated amount TRS of rise in temperature of the motor 330, compares the amount TRS with a threshold value. This threshold value meets the following condition: When the temperature rise amount of the motor 330 is equal to this threshold value or less in the environment that maintains the ambient temperature of the motor 330 at an acceptable upper limit, the motor 330 is usable safely without its coils and the switching devices of the driver circuit 320 burning out. In other words, this threshold value is set to be sufficiently smaller than the amount of rise in temperature that occurs when the motor 330 truly falls into an overheat condition. This amount is hereinafter referred to as the "upper limit of temperature rise." In particular, the difference between the threshold value and the upper limit, or a margin, is ensured to be sufficiently larger than a standard error of the estimated amount TRS. The temperature at which the motor 330 and the driver circuit 320 fall into an overheat condition seems to be constant independently of their ambient temperature, which is sufficiently lower than its acceptable upper limit in many situations. Accordingly, the upper limit of temperature rise is, in many cases, higher than the level assumed at the setting of this threshold value. As long as the estimated amount TRS of temperature rise is maintained to be equal to the threshold value or less, there is no risk that an actual amount of temperature rise reaches the upper limit, i.e. the risk that the motor 330 falls into an overheat condition. Even if the estimated amount TRS exceeds the threshold value, at the time, there seems to still remain a difference between the temperature rise amount of the motor 330 and its upper limit.

When the estimated amount TRS of temperature rise exceeds the threshold value, the notification unit 313 sends a request RQS for change in operation mode to the CPU 61 of the main controller unit 60. The notification unit 313 thus allows the main controller unit 60 to change the operation mode before the motor 330 falls into an overheat condition, i.e. can prevent the motor 330 from overheating.

Measurement of Power Loss of Motor from Duty Ratio

The measuring unit 331 substitutes the duty ratio, d, that the voltage instruction DTY indicates into the following quadratic equation, Eq. (1), to calculate a measured value PL of power loss of the motor 330:

$$PL = c_2[N]d^2 + c_1[N]d + c_0[N], \quad (1)$$

$$c_2[N] = \frac{Vcc}{Kt \cdot A[N]}, \quad c_1[N] = \frac{-1}{A[N]}\left(2\pi N + \frac{Vcc \cdot d[N]}{Kt}\right),$$

$$c_0[N] = \frac{2\pi N \cdot d[N]}{A[N]}.$$

The constant Vcc represents power supply voltage, and the constant Kt represents the torque constant of the motor 330. The parameter N represents a rotation rate of the motor 330. The parameters A[N] and d[N] are functions of the rotation rate N in general and represent the torque-duty characteristics of the motor 330.

The torque constant Kt and the parameters A[N] and d[N] are calculated from design values of the motor 330 or determined by experiments. Accordingly, the coefficients $c_2[N]$, $c_1[N]$, and $c_0[N]$ in Eq. (1) are calculable when the rotation rate N of the motor 330 is determined. The measuring unit 331 calculates these coefficients $c_2[N], \ldots,$ from the target value Ntg of the rotation rate set by the rate control unit 321.

Derivation of Eq. (1)

Figure 4A:
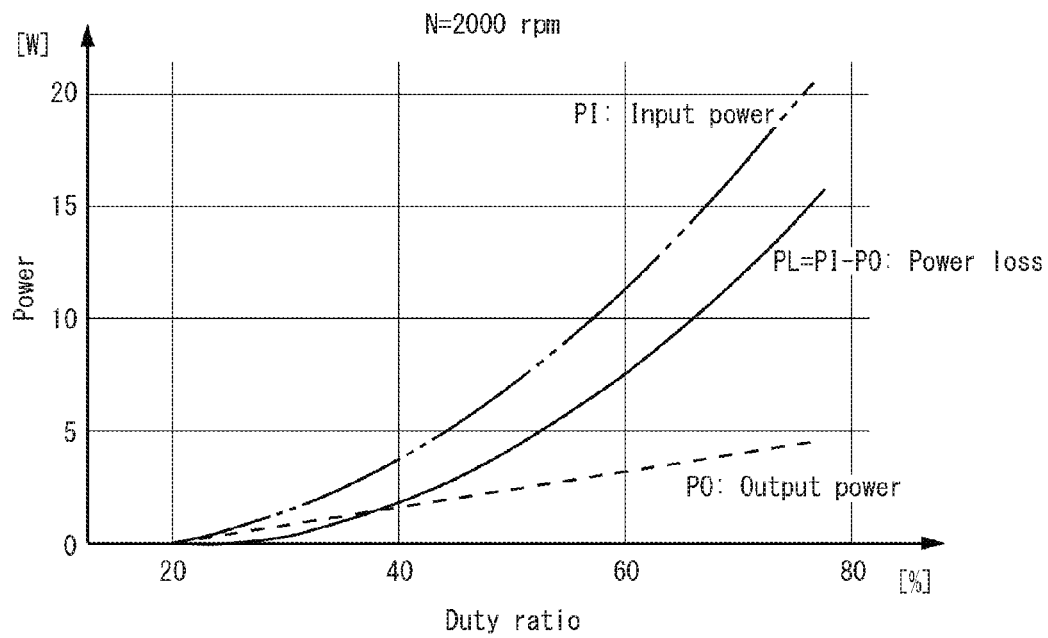
FIG. 4A is a graph illustrating relationships of the input power, output power, and power loss of a motor to the duty ratio of PWM control that makes the motor keep its rotation rate N at 2,000 rpm.

FIG. 4A is a graph illustrating relationships of the input power PI, output power PO, and power loss PL of the motor 330 to the duty ratio of PWM control that makes the motor keep its rotation rate N at 2,000 rpm. Referring to FIG. 4A, the input power PI is represented by a quadratic curve of the duty ratio d, and the output power PO is by a linear curve, i.e., a straight line. Accordingly, the power loss PL, the difference between the powers, is represented by a quadratic curve of the duty ratio d. The following explains that the input power PI and the output power PO have such function forms.

Figure 4B:
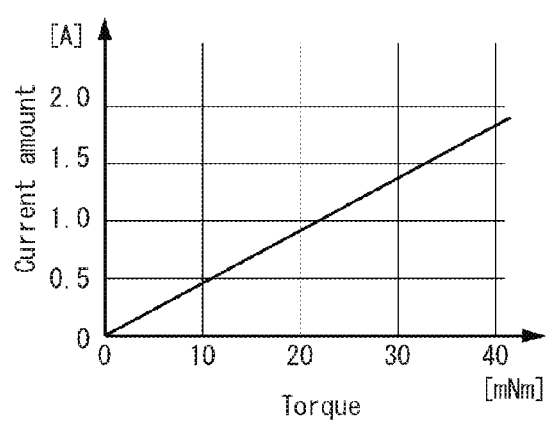
FIG. 4B is a graph illustrating the torque-current characteristics of the motor.

FIG. 4B is a graph illustrating the torque-current characteristics of the motor 330. Referring to FIG. 4B, the characteristics are represented by a straight line passing through the origin since the motor 330 is of a DC type. DC motors generally generate torques, Trq, proportional to current amounts, I, flowing through their coils or the switching devices of their driver circuits (hereinafter, abbreviated to as "coils, etc."): Trq=Kt×I. The proportionality coefficient Kt is the torque constant Kt of the motor 330. The slope of the straight line illustrated in FIG. 4B is equal to the reciprocal of the proportionality coefficient Kt, and thus does not depend on the rotation rate N of the motor 330.

Figure 4C:
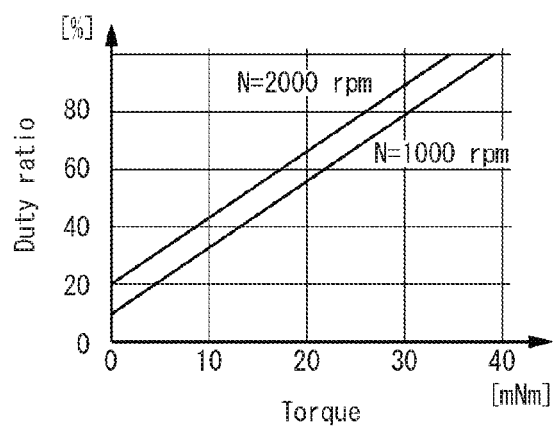
FIG. 4C is a graph illustrating torque-duty characteristics of the motor when PWM control makes the motor keep its rotation rate N at 2,000 rpm or 1,000 rpm.

FIG. 4C is a graph illustrating the torque-duty characteristics of the motor 330 when the PWM control makes the motor keep its rotation rate N at 2,000 rpm or 1,000 rpm. Referring to FIG. 4C, the characteristics are represented by straight lines since the motor 330 is of a DC type. DC motors generally have rotation rates N proportional to the difference between voltages V applied across their coils, etc. and voltage drop amounts IR due to the resistance R of the coils, etc.: N=Ki (V−IR). The proportionality coefficient Ki is the reciprocal ratio of the induced voltage constant of the motor 330. On the other hand, the average pulse voltage Vav that the motor 330 receives per PWM cycle, i.e. per cycle of voltage pulses that the driver circuit 320 applies to the motor 330 at the duty ratio d, is equal to the product of the power supply voltage Vcc and the duty ratio d: Vav=Vcc×d. The current amount I is proportional to the torque Trq, and thus the duty ratio d and the torque Trq satisfy the following linear equation, Eq. (2):

$$N = Ki\left(Vcc \cdot d - R\frac{Trq}{Kt}\right), \quad (2)$$

$$\therefore d = A \cdot Trq + d[N], \quad A = \frac{R}{Vcc \cdot Kt}, \quad d[N] = \frac{N}{Vcc \cdot Ki}.$$

The coefficients A and d[N] are equal to the above-defined parameters A[N] and d[N], respectively. Thus, the torque-duty characteristics of the motor 330 of a DC type are represented by straight lines with slopes and intercepts corresponding to the parameters A[N] and d[N], respectively. In particular, the slopes A[N] are independent of the rotation rates N, but the intercepts [N] are proportional to the rotation rates N.

The input power PI of the motor 330 is equal to the product of the average voltage Vav and the current amount I: PI=Vav×I. The average voltage Vav is proportional to the duty ratio d, and the current amount I is to the torque Trq; the torque Trq is represented by a linear expression of the duty ratio d derived from Eq. (2): Trq=(d−d[N])/A. Accordingly, the input power PI is represented by the following quadratic expression of the duty ratio d, Eq. (3):

$$PI = Vcc \cdot d\frac{Trq}{Kt} = \frac{Vcc}{Kt \cdot A}d(d - d[N]). \quad (3)$$

The output power PO of the motor 330 is equal to a rate at which the motor does work upon its load, and thus is proportional to the product of the rotation rate N and the torque Trq: PO=2πN×Trq. The torque Trq is the linear expression of the duty ratio d derived from Eq. (2): Trq= (d−d[N])/A. Accordingly, the output power PO is represented by the following linear expression of the duty ratio d, Eq. (4):

$$PO = \frac{2\pi N}{A}(d - d[N]). \tag{4}$$

The expression of the power loss PL=PI−PO, Eq. (1), is derived from the difference between Eqs. (3) and (4).

As shown in Eq. (2), the parameters A and d[N] are determined by the coefficients Kt and Ki intrinsic to the motor 330 and the resistance R of their coils, etc. Accordingly, values of the parameters are calculated from the design values of the motor 330 or determined by experiments, and then stored in a memory that is, together with the measuring unit 331, embedded into an electronic circuit such as ASIC and FPGA. The parameter d[N] is dependent on, esp. proportional to the rotation rate N of the motor 330, and thus its values stored in the memory are classified according to rotation rate of the motor 330.

Principle of Estimating Temperature Rise Amount of Motor with LPF

Configuration of LPF

Figure 5A:
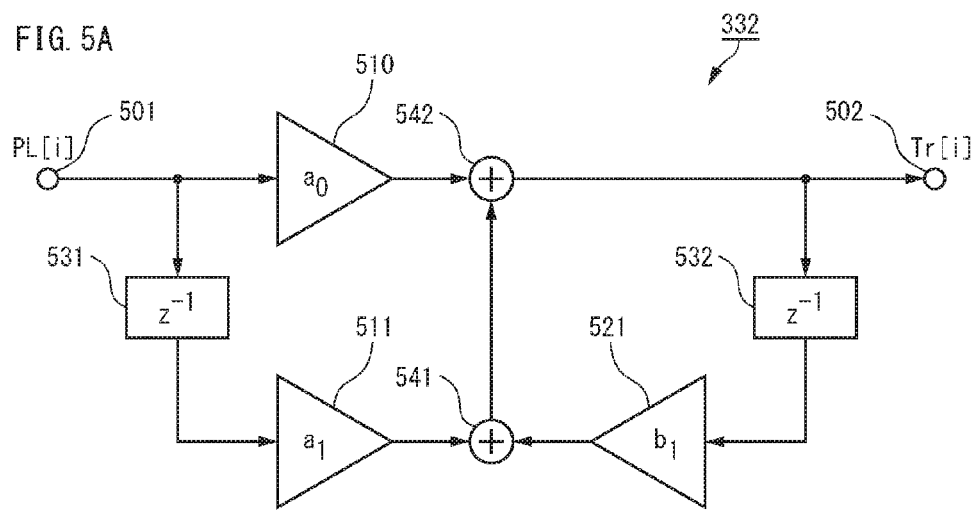
FIG. 5A is a block diagram of the LPF illustrated in FIG. 3.

FIG. 5A is a block diagram of the LPF 332. Referring to FIG. 5A, the LPF 332 includes between an input terminal 501 and an output terminal 502 three multipliers 510, 511, 521, two delayers 531, 532, and two adders 541, 542.

The input terminal 501 samples measured values, PL[i], (the integer i=0, 1, 2, . . . ) of power loss of the motor 330 from the measuring unit 331 at constant intervals of time, Ts. The (i+1)-th sample PL[i] indicates a measured value of the power loss after the elapse of a time period, iTs, the integer i times one interval Ts, from the start of the sampling.

The output terminal 502 sends estimated amounts of rise in temperature of the motor 330 to the notification unit 313 at the same intervals Ts; the amounts Tr[i] are differences between estimated amounts Tm[i] of temperature of the coils, etc., and their ambient temperatures Ta: Tr[i]=Tm[i]−Ta. In other words, the output terminal 502 sends the (i+1)-th estimated amount Tr[i] when the time period iTs, the integer i times one interval Ts, has elapsed after sending the first estimated amount Tr[0].

Whenever receiving a sample PL[i] from the input terminal 501, the first multiplier 510 calculates the product of the sample PL[i] and a filter coefficient $a_0$, and then sends the product to the second adder 542. Whenever receiving a sample PL[i] from the input terminal 501, the first delayer 531 holds the sample PL[i] during the sampling interval=1 Ts, and then sends the sample PL[i] to the second multiplier 511. Whenever receiving from the first delayer 531 a one-interval, 1-Ts, prior sample PL[i−1], the second multiplier 511 calculates the product of the sample PL[i−1] and a second filter coefficient $a_1$, and then sends the product to the first adder 541.

Whenever receiving from the output terminal 502 an estimated amount Tr[i] of temperature rise, the second delayer 532 holds the amount Tr[i] during the sampling interval=1 Ts, and then sends the amount Tr[i] to the third multiplier 521. Whenever receiving from the second delayer 532 a one-interval, 1-Ts, prior estimated amount Tr[i−1], the third multiplier 521 calculates the product of the amount Tr[i−1] and a third filter coefficient $b_1$, and then sends the product to the first adder 541.

The first adder 541 calculates the sum of an output $a_1 \times PL[i-1]$ of the second multiplier 511 and an output $b_1 \times Tr[i-1]$ of the third multiplier 521, and then sends the sum to the second adder 542. The second adder 542 adds the sum $a_1 \times PL[i-1] + b_1 \times Tr[i-1]$ to an output $a_0 \times PL[i]$ of the first multiplier 511, and then sends to the output terminal 502 the total as an estimated amount Tr[i].

With the above-described configuration, the LPF 332 calculates an estimated amount Tr[i] of temperature rise when the time period iTs, the integer i times one interval Ts, has elapsed from the start of the sampling, by substituting samples, i.e. measured values PL[·] of the power loss into the following equation, Eq. (5):

$$Tr[i] = a_0 \cdot PL[i] + a_1 \cdot PL[i-1] + b_1 \cdot Tr[i-1]. \tag{5}$$

Eq. (5) is a discrete representation of the thermal model of the motor 330. The three filter coefficients $a_0$, $a_1$, and $b_1$ are numerical values that are represented by the thermal capacitance and resistance of the coils, etc., of the motor 330, especially by the thermal response rate of the motor 330, the reciprocal ratio of the thermal time constant of the motor. These values are determined in advance by experiments or simulations, and are stored in a memory that is, together with the LPF 332, embedded into an electronic circuit such as ASIC and FPGA.

The LPF 332 repeats the recursive calculation by the thermal model (5) at the sampling intervals Ts to calculate the weighted sum of the measured values PL[i] of the power loss by using the filter coefficients $a_0$, $a_1$, and $b_1$ as the weights. This sum is equivalent to an integral of the power losses PL, and indicates the estimated amount Tr of temperature rise.

Derivation of Eq. (5)

It is considered that, while the motor 330 operates, the coils, etc. generate heat corresponding to the power loss PL, i.e. the entirety of remaining energy after losing from the input power PI an amount PO of work on the application of torque to loads. Part of this heat amount PL is stored into the coils, etc., of the motor 330 to raise their temperature, and the remainder is dissipated into their surroundings. The amount of heat stored into the motor 330 is represented by the product of the thermal capacitance Ch of the coils, etc. and a derivative of their temperature Tm with respect to time, t. The amount of heat dissipated from the motor 330 is represented by the ratio of a difference, Tr, in temperature to the thermal resistance, Rh, of the coils, etc.; the difference Tr is one between the temperature Tm of the coils, etc. and their ambient temperature Ta, Tr=Tm−Ta. Thus, the thermal model of the motor 330 is represented by the following equation, Eq. (6):

$$PL = Ch \cdot \frac{dTm}{dt} + \frac{Tm - Ta}{Rh} = Ch \cdot \frac{dTr}{dt} + \frac{Tr}{Rh}. \tag{6}$$

On the other hand, change in estimated amounts Tr of temperature rise within one sampling interval, 1 Ts, is represented by an integral of the time derivative of the amounts Tr, dTr/dt, over the sampling interval. Approximating the integral by the sum of discrete numerical values results in the following equation, Eq. (7):

$$Tr[t=iTs]-Tr[t=(i-1)Ts]= \quad (7)$$

$$\int_{(i-1)Ts}^{iTs} \frac{dTr}{dt} dt \approx \frac{Ts}{2}\left(\frac{dTr}{dt}[iTs] + \frac{dTr}{dt}[(i-1)Ts]\right).$$

Eq. (5) is derived from Eqs. (6) and (7), as described below. Especially, identifying the values of the variables Tr and PL at the time t=i Ts with the i-th samples Tr[i] and PL[i], respectively, represents the filter coefficients $a_0$, $a_1$, and $b_1$ with the following equation, Eq. (8):

$$Tr[i]-Tr[i-1] = \frac{Ts}{2}\left(\frac{dTr}{dt}[iTs] + \frac{dTr}{dt}[(i-1)Ts]\right) = \quad (5)$$

$$\frac{Ts}{2}\left\{\frac{PL[i]}{Ch} - \frac{Tr[i]}{Rh \cdot Ch} + \left(\frac{PL[i-1]}{Ch} - \frac{Tr[i-1]}{Rh \cdot Ch}\right)\right\}$$

$$\therefore \left(1 + \frac{Ts}{2}\frac{1}{Rh \cdot Ch}\right)Tr[i] =$$

$$\frac{Ts}{2}\frac{1}{Ch}(PL[i]+PL[i-1]) + \left(1 - \frac{Ts}{2}\frac{1}{Rh \cdot Ch}\right)Tr[i-1]$$

$$\therefore Tr[i] = a_0 \cdot PL[i] + a_1 \cdot PL[i-1] + b_1 \cdot Tr[i-1],$$

$$a_0 = a_1 = Rh \frac{\frac{\omega_A Ts}{2}}{1+\frac{\omega_A Ts}{2}}, \quad b_1 = \frac{1-\frac{\omega_A Ts}{2}}{1+\frac{\omega_A Ts}{2}}, \quad \omega_A = \frac{1}{Rh \cdot Ch}, \quad (8)$$

$$\frac{\omega_A Ts}{2} = \tan\frac{\omega_D Ts}{2} = \tan\frac{Ts}{2\tau}.$$

The angular frequency $\omega_A$ is defined as the reciprocal of the product of the thermal resistance Rh and the thermal capacitance Ch of the coils, etc. of the motor 330, i.e. the reciprocal of the time constant, $\tau_A$=Rh Ch, of the thermal model of the motor 330. The angular frequency $\omega_A$ represents the thermal response rate of the motor 330, and determines the cut-off angular frequency $\omega_D$ of the LPF 332, i.e. the time constant $\tau_D$=1/$\omega_D$ of the LPF 332, according to Eq. (8).

Effects of Estimation by LPF

The thermal model (5) of the motor 330 involves both heat stored in it and heat dissipated from it, as shown in Eq. (6). Even while the motor 330 is at rest, the LPF 332 can thus estimate how dissipation reduces the amount of heat stored in the motor 330 from the value before the motor 330 stops.

Figure 5B:
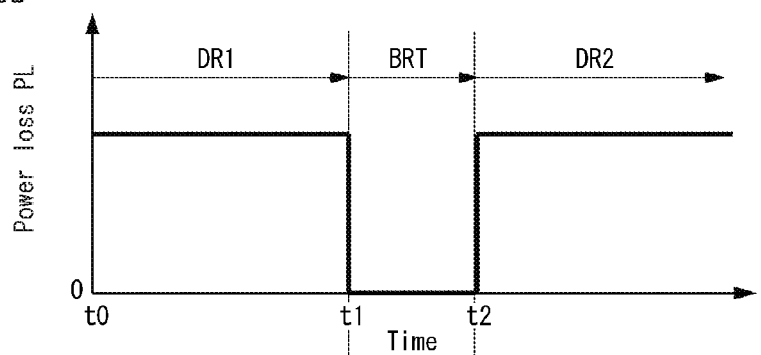
FIG. 5B is a graph illustrating a temporal change in measured values of power loss that the LPF receives.

FIG. 5B is a graph illustrating temporal changes in measured values PL of power loss that the LPF 332 receives. Referring to FIG. 5B, the motor 330 starts one continuous operation at an activation time $t_0$, stops during a rest period BRT, and then performs another continuous operation. The measuring unit 331 measures a power loss PL of the motor 330 after the activation time $t_0$ as follows. During both the first operation period DR1 and the second operation period DR2, the motor 330 keeps its rotation rate to the same target value, and thus maintains the power loss PL at the same value PLT. During the rest period BRT, on the other hand, the motor 330 stops rotating, and thus maintains the power loss PL at zero.

Figure 5C:
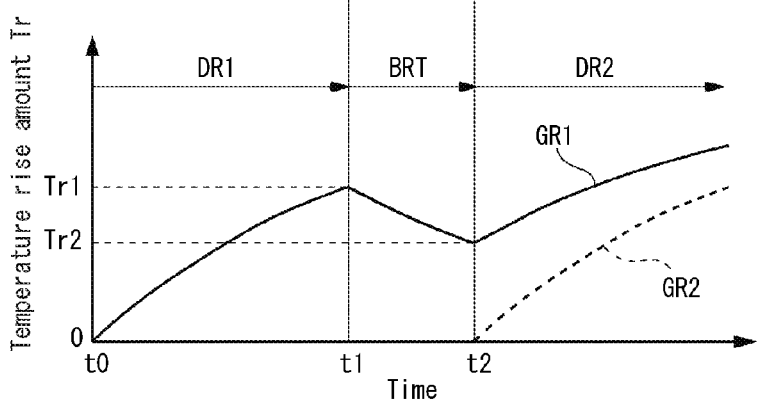
FIG. 5C is a graph illustrating the temporal change in outputs of the LPF, i.e. estimated amounts of rise in temperature of the motor, the change caused by the change in measured values shown in FIG. 5B.

FIG. 5C is a graph illustrating temporal changes in output of the LPF 332, i.e. changes in estimated amount Tr of rise in temperature of the motor 330 caused by change in measured value PL shown in FIG. 5B. As FIG. 5C shows with a solid-line graph GR1, the estimated amounts Tr change as follows. During the first operation period DR1, the motor 330 keeps the power loss PL, i.e. the heat amount that the motor generates, at a constant value PLT. From the activation time $t_0$ to the end time $t_1$ of the first operation period DR1, the estimated amount Tr of temperature rise thus increases from an initial value, zero, to a peak value, Tr1. This increase indicates that the temperature Tm (of the coils, etc.) of the motor 330 rises from the ambient temperature Ta by a height Tr1. During the rest period BRT, the motor 330 does not lose power, i.e. does not generate heat, and thus the estimated amount Tr of temperature rise reduces from the peak value Tr1 to a local minimum value Tr2 due to heat dissipation from the motor 330. This reduction indicates that the temperature Tm of the motor 330 drops by a height Tr1−Tr2 from the temperature Ta+Tr1 at the end time $t_1$ of the first operation period DR1. During the second operation period DR2, the motor 330 again keeps the power loss PL at the constant value PLT. From the start time $t_2$ of the second operation period DR2, the estimated amount Tr of temperature rise thus increases from the local minimum value Tr2. This increase indicates that the temperature Tm of the motor 330 rises from the temperature Ta+Tr2 at the end time $t_2$ of the rest period BRT.

As discussed above, the estimated amount Tr of temperature rise represented by the solid-line graph GR1 in FIG. 5C reflects the following two features: 1. During the rest period BRT of the motor 330, the temperature Tm of the motor 330 drops due to heat dissipation; and 2. at the time t2 when the motor 330 restarts operating, an amount of heat stored in the motor 330 causes the difference Tr2 between the temperature Tm of the motor 330 and the ambient temperature Ta.

On the other hand, a broken-line graph GR2 in FIG. 5C represents how the estimated amount Tr of temperature rise temporally changes after initialized to zero at the start time t2 of the second operation period DR2. As the graph GR2 shows, the estimated amount Tr changes during the second operation period DR2 similarly to during the first operation period DR1. Especially, the estimated amount represented by the broken-line graph GR2 is lower than that represented by the solid-line graph GR1. This demonstrates that the above-mentioned two features 1 and 2 that the estimation of temperature rise amount reflects enable earlier detection, i.e. more accurate detection of risk of overheating the motor 330.

Even when the motor 330 keeps its rotation rate constant, the measured value PL of power loss of the motor 330 actually includes fluctuation components. These components are not illustrated in FIG. 5B, but appear due to fluctuation of power that the motor 330 consumes to keep the rotation rate constant against load fluctuation. This fluctuation of the power is fed back by the controller unit 311 to fluctuation of duty ratios d that voltage instructions DTY indicate, thus dynamically reflected through the fluctuation of the duty ratios d into measured values PL of power loss, and further into amounts Tr of rise in temperature of the motor 330 that the LPF 332 estimates.

In this way, the amounts Tr of rise in temperature of the motor 330 that the LPF 332 estimates dynamically reflect fluctuation of load of the motor 330, no matter how the load fluctuates. This enables high accuracy of the estimated amounts Tr irrespective of load fluctuation.

Frequency of Estimating Amount of Rise in Temperature of Motor

The temperature of the motor 330 changes sufficiently slower than pulse voltage that the driver circuit 320 applies to the motor 330 does. Indeed, the cycle of general pulse voltage, i.e. general PWM cycle is equal to or less than the reciprocal of an upper limit of audible frequency, which is nearly equal to the reciprocal of two dozen kHz, or nearly equal to $10^{-5}$ seconds. Accordingly, the cycle is negligibly shorter than the time constant $\tau_A$ of the thermal model (6) of the motor 330, i.e. the reciprocal of the angular frequency $\omega_A$.

Thus, the measuring unit 331 calculates an average of duty ratios that the voltage instructions DTY indicate over each predetermined interval of time, and uses the average to measure a power loss PL. More specifically, the measuring unit 331 first samples duty ratios that the voltage instructions DTY indicate at the intervals that are each equal to an integral multiple of the PWM cycle, preferably equal to an integral multiple of one of intervals at which the controller unit 311 updates the duty ratios, or several to a dozen times as long as the PWM cycle. The measuring unit 331 next calculates an average of each predetermined number, two or more, of samples of the duty ratios when storing the number of samples, and then uses the average to measure a power loss of the motor 330.

By using the average of each two or more of the duty ratios to measure a power loss PL, the measuring unit 331 can suppress the calculation amount necessary for measuring the power loss PL. Since averages of the duty ratios vary more narrowly than the duty ratios themselves do, the measuring unit 331 can also reduce errors of measuring the power loss.

The measuring unit 331 adjusts the intervals of sampling the duty ratios to prevent them from equaling the fluctuation cycles of load of the motor 330, and thus protects the measuring accuracy from degrading due to the load fluctuation. More specifically, the measuring unit 331 first sets an initial frequency of sampling the duty ratios to a value sufficiently higher than an assumed frequency band of the load fluctuation. This frequency band is predicted by experiments or simulations from the mechanical characteristics of movable members that the motor 330 should drive, such as conveyance rollers, and mechanisms that transmit drive forces from the motor 330 to the movable members, such as gears and belts. The measuring unit 331 next detects an actual cycle of the load fluctuation from fluctuation of the duty ratios sampled at intervals corresponding to the initial frequency, and then adjusts the intervals of sampling the duty ratios so that the intervals have sufficiently large differences from any of the detected cycles and integral multiples of them.

Protection of Motor from Overheating by Change in Operation Mode

It seems to be true that an estimated amount TRS of rise in temperature of the motor 330 exceeding the threshold value indicates that the motor 330 does not reach overheat but is at risk of it. At this time, the notification unit 313 sends the request RQS for change in operation mode to the CPU 61 of the main controller unit 60 to have the main controller unit 60 change operation modes in such a manner that the motor 330 can avoid overheat. More specifically, the notification unit 313 has the main controller unit 60 switch to an operation mode in which the motor 330 keeps a lower rotation rate. This is for the following reason.

Figure 6A:
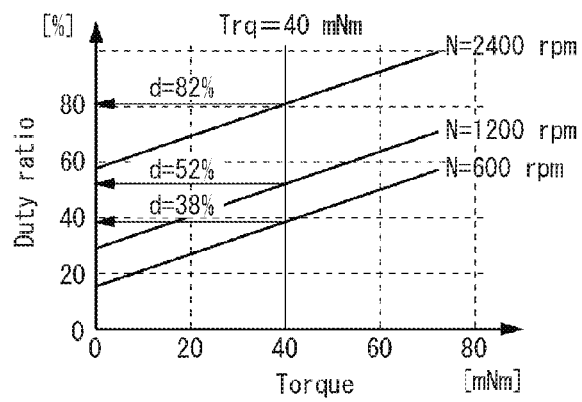
FIG. 6A is a graph illustrating torque-duty characteristics of the motor with its rotation rate N=2,400 rpm, 1,200 rpm, or 600 rpm.

FIG. 6A is a graph illustrating torque-duty characteristics of the motor 330 with its rotation rate N=2,400 rpm, 1,200 rpm, or 600 rpm. Referring to FIG. 6A, the characteristics are represented by straight lines since the motor 330 is of a DC type, like the characteristics shown in FIG. 4C. As Eq. (2) represents, the slopes A of the straight lines are independent of the rotation rates N, but the intercepts d[N] of the straight lines are proportional to the rotation rates N.

Generally when used in the printer 100, the motor 330 should apply to load constant torque independent of its rotation rate. As FIG. 6A shows, a higher rotation rate N corresponds to a higher duty ratio d. For example, for the torque Trq=40 mNm, the rotation rates N=2400 rpm, 1200 rpm, and 600 rpm correspond to the duty ratios d nearly equal to 82%, 52%, and 38%, respectively.

Figure 6B:
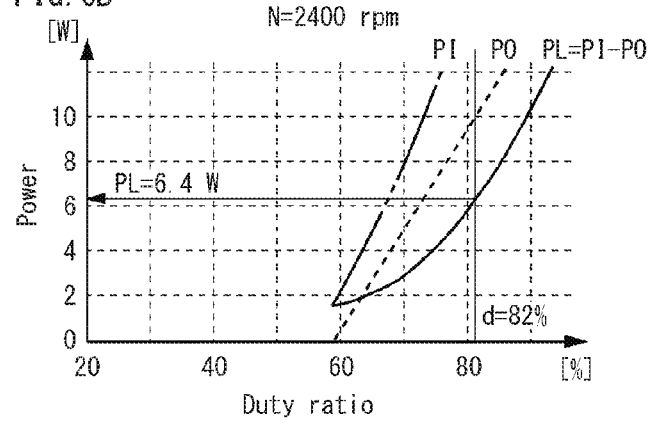
FIGS. 6B, 6C, and 6D are graphs illustrating relationships of duty ratios of PWM control for a motor to the input power PI, output power PO, and power loss PL of the motor when the PWM control makes the motor keep its rotation rate N at 2,400 rpm, 1,200 rpm, and 600 rpm, respectively.
Figure 6C:
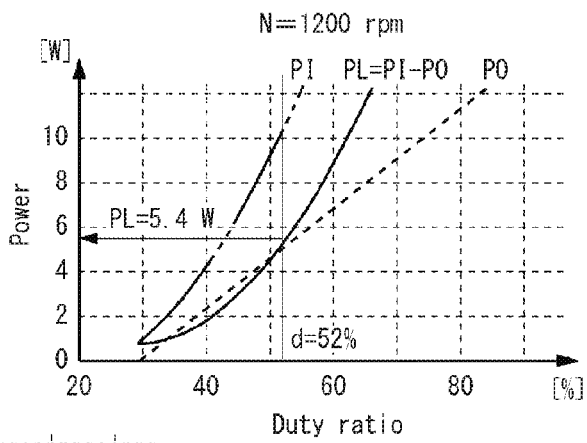
Figure 6D:
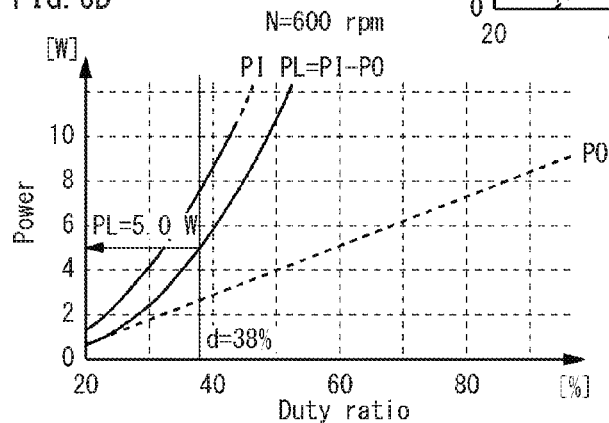

FIGS. 6B, 6C, and 6D are graphs illustrating relationships of duty ratios d of PWM control for the motor 330 to the input power PI, output power PO, and power loss PL of the motor 330 when the PWM control makes the motor keep its rotation rate N at 2,400 rpm, 1,200 rpm, and 600 rpm, respectively. Referring to FIGS. 6B, 6C, and 6D in order, the duty ratio d=82%, 52%, and 38% relate to the power losses PL nearly equal to 6.4 W, 5.4 W, and 5.0 W, respectively.

When used in the printer 100, the motor 330 running at a higher rotation rate N results a higher power loss PL, and thus generates a larger amount of heat, as discussed above. For this reason, a lower rotation rate N of the motor 330 should reduce the amount of heat.

Suppose that an amount of rise in temperature of the motor 330 exceeding the threshold value triggers lowering the rotation rate N of the motor 330. In this case, decrease in amount of generated heat lowers the rate of rise in temperature, and then stops the rise, and finally causes the temperature to fall. The motor 330 in an operation mode keeping a lower rotation rate accordingly limits for a longer time the rise in temperature to an amount equal to the threshold value or less.

When the estimated amount Tr of rise in temperature of the motor 330 exceeds the threshold value, the notification unit 313 sends a request for change of operation mode to the main controller unit 60 to have the main controller unit 60 switch to an operation mode in which the motor 330 keeps a lower rotation rate. Switching to the operation mode has the motor 330 generate a smaller amount of heat, and accordingly in the operation mode, the temperature rise keeps its amount equal to the threshold value or less for a longer time than in the previous operation mode. This enables the printer 100 to continue operations with use of the motor 330.

Motor Control Procedure

Figure 7:
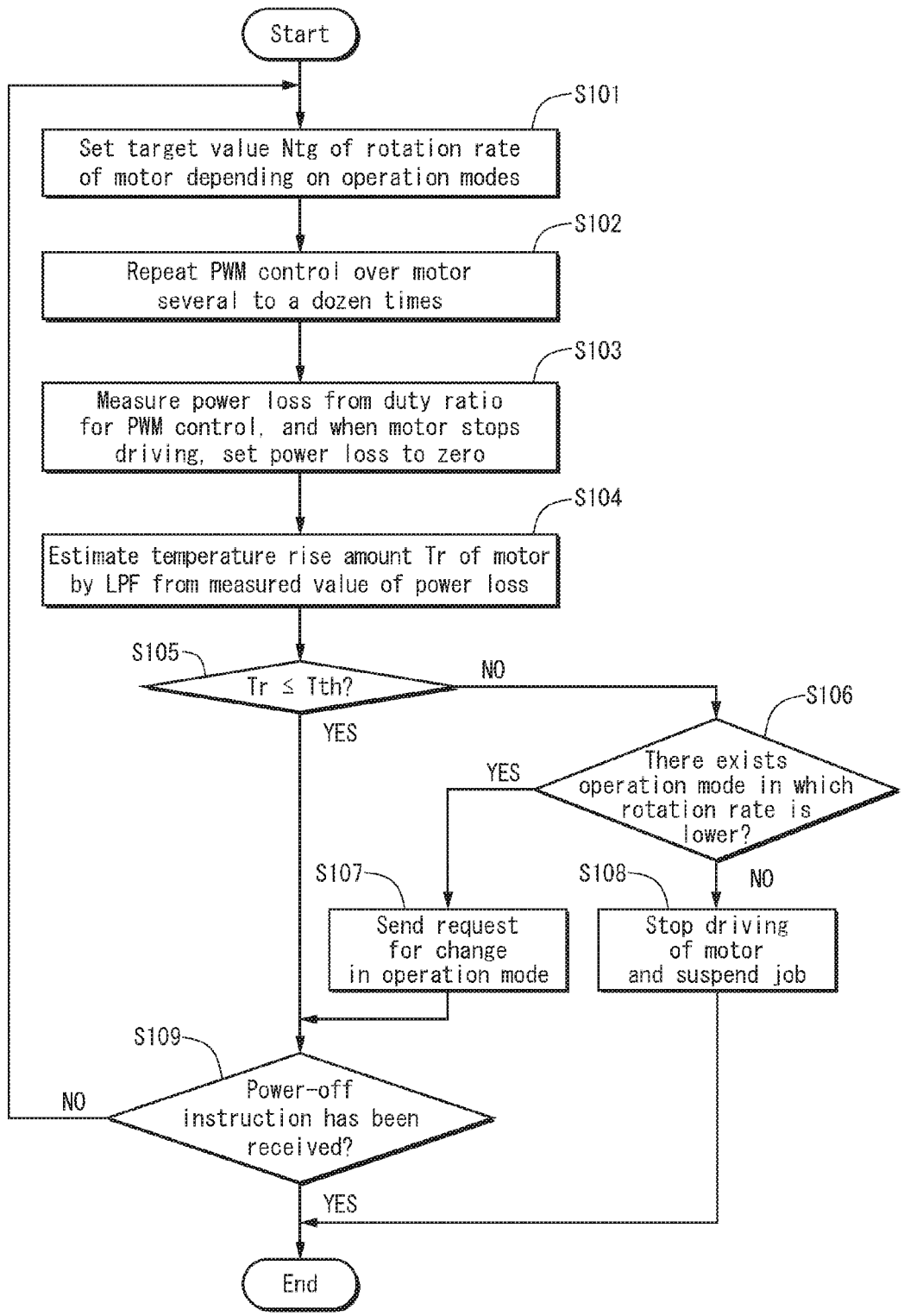
FIG. 7 is a flowchart of motor control by the configuration illustrated in FIG. 3.

FIG. 7 is a flowchart of motor control by the common configuration 300 illustrated in FIG. 3. This motor control starts when the controller unit 311 activates the motor 330 to be controlled in response to power-on of the printer 100.

In step S101, the controller unit 311 receives a driving signal DRV from the main controller unit 60, identifies from the signal DRV an operation mode, and then sets the rotation rate of the motor 330 to a target value Ntg different according to the operation mode. Then, the motor control proceeds to step S102.

In step S102, the controller unit 311 performs PWM control over the motor 330. More specifically, the rate control unit 321 uses the difference between the target value Ntg and the measured value Nms of the rotation rate to calculate a duty ratio, and enters the duty ratio as a voltage instruction DTY into the PWM unit 322. In response to the voltage instruction DTY, the PWM unit 322 sends the control signal CTS to the driver circuit 320 to instruct when to turn the switching devices on and off. In response to this control signal CTS, the driver circuit 320 adjusts to the value that the voltage instruction DTY indicates the duty ratio of pulse current to be supplied to the motor 330. The detector unit 323 measures the rotation rate of the motor 330 from the frequency of the output signal FGP of the encoder 340, and feeds back the measured value Nms to the rate control unit 321. The controller unit 311 repeats a series of these operations in the PWM control several to a dozen times. The rate control unit 321 preferably updates the duty ratio only when the controller unit 311 repeats the PWM control several times. Then, the motor control proceeds to step S103.

In step S103, the measuring unit 331 measures the power loss of the motor 330 from the duty ratio that the voltage instruction DTY indicates. More specifically, the measuring unit 331 substitutes the duty ratio d into Eq. (1) to calculate the measured value PL of the power loss of the motor 330. Especially when detecting stop of the motor 330, for example, from the duty ratio d equal to zero, the measuring unit 331 sets the measured value PL to zero. Then, the motor control proceeds to step S104.

In step S104, the LPF 332 uses the thermal model (5) of the motor 330 to integrate measured values PL of power loss of the motor 330, thus estimating an amount of rise in temperature of the motor 330. More specifically, the LPF 332 uses the measured value PL calculated in step S103 to perform recursive calculation by the thermal model (5), and adds the value PL to the sum weighted by the filter coefficients $a_0$, $a_1$, and $b_1$. The LPF 332 further sends this sum as an estimated amount Tr of temperature rise to the notification unit 313. Then, the motor control proceeds to step S105.

In step S105, the notification unit 313 compares the estimated amount Tr of temperature rise with the threshold value Tth to check whether or not the estimated amount Tr exceeds the threshold value Tth. When the estimated amount Tr is equal to the threshold value Tth or less, the motor control proceeds to step S109. When the estimated amount Tr exceeds the threshold value Tth, the motor control proceeds to step S106.

In step S106, the estimated amount Tr of temperature rise exceeds the threshold value Tth, and thus the notification unit 313 checks whether or not available operation modes include one in which the motor 330 keeps a lower rotation rate than in a current operation mode. If such an operation mode remains, the motor control proceeds to step S107, and if not, the control proceeds to step S108.

In step S107, there still remains an operation mode in which the motor 330 keeps a lower rotation rate than in the current operation mode. Assume, for example, that there exist three available operation modes, which are a low rate mode ML, a middle rate mode MM, and a high rate mode MH, in order of increasing rotation rate of the motor 330, and the current operation mode is the high rate mode MH. In this case, the notification unit 313 sends a request for a change of operation mode to the main controller unit 60 to have the main controller unit 60 switch to the middle rate mode MM, for example, as an operation mode in which the motor 330 keeps a lower rotation rate than in the current operation mode, the high rate mode MH. Then, the motor control proceeds to step S109.

In step S108, there remains no operation mode in which the motor 330 keeps any lower rotation rate than in the current operation mode. For example, when the current operation mode is the low rate mode ML, the notification unit 313 has the controller unit 311 cut off power supply to the motor 330 by setting the duty ratio d to zero or the like, and then sends a request for suspension of jobs to the main controller unit 60. In this way, the motor control device 310 forces to stop the motor 330 to prevent it from overheat. Then, the motor control ends.

In step S109, the estimated amount Tr of temperature rise is equal to the threshold value Tth or less, and thus there is no risk of overheating the motor 330 even if jobs continue to be processed. Accordingly, the controller unit 311 inquires the main controller unit 60 about whether or not to have an instruction to power off the printer 100. If the main controller unit 60 has received the instruction, the motor control ends, and if not, the control is repeated from step S101.

The above-described motor control suppresses amounts of calculation by the measuring unit 331 and the LPF 332 since these units calculate at intervals that are each longer than the cycle of PWM control by the controller unit 311. In step S102, the rate control unit 321 updates the duty ratio each time the controller unit 311 repeats PWM control several times. Each time the controller unit 311 repeats PWM control several to a dozen times in step S102, the measuring unit 331 measures a value PL of power loss from an average of samples of the duty ratios in step S103, and the LPF 332 estimates an amount Tr of rise in temperature of the motor 330 in step S104. Accordingly, the intervals at which the measuring unit 331 samples the duty ratios are integral multiples of the PWM cycle, preferably integral multiples of the intervals at which the controller unit 311 updates the duty ratios. Furthermore, both the interval in which the measuring unit 331 measures a value PL of power loss and the interval in which the LPF 332 estimates an amount Tr of temperature rise are several to a dozen times as long as the PWM cycle, i.e. not less than "the interval of sampling the duty ratios" times "the number of samples per average of the duty ratios (≥2)."

Advantages of Embodiment 1

The motor control device 310 according to embodiment 1 of the present invention, as described above, measures power loss of the motor 330 from duty ratios d of pulse voltage that the driver circuit 320 applies to the motor 330. The device estimates from the measured values PL[i] amounts Tr of rise in temperature of the motor 330 by using the thermal model (5) of it. The device feeds back to fluctuation of the duty ratios d the state of the driver circuit 320, the state of the motor 330, and fluctuations of load of the motor. The thermal model (5) of the motor 330 involves both heat stored in it and heat dissipated from it. The LPF 332 can thus estimate amounts TIM of temperature rise even if the measured values PL[i] of power loss are maintained to zero while the motor 330 is at rest. Accordingly, the motor control device 310 can, even if any load fluctuation affects the motor 330 and the printer 100 repeatedly processes intermittent jobs, maintain high accuracy of estimating amounts Tr of rise in temperature of the motor 330 throughout the whole period of processing the jobs.

When the estimated amount TIM of rise in temperature of the motor 330 exceeds the threshold value Tth, the notification unit 313 sends a request for change of operation mode to the main controller unit 60 to have the main controller unit 60 switch to an operation mode in which the motor 330 keeps a lower rotation rate. Switching to the operation mode has the motor 330 generate a smaller amount of heat, and thus avoid the risk of overheat. The switching also reduces the rate of temperature rise, and thus extends the length of the time when estimated amounts Tr[i] of temperature rise are equal to the threshold value or less. For this extended time, the motor control device 310 enables the printer 100 to continue operations with use of the motor 330. In this way, the motor control device 310 enables the motor 330 to continue operations without overheat, and thus can maintain high levels of both reliability and productivity for job processing.

Modifications (A) The motor control device 310 according to embodiment 1 of the present invention is mounted on the color laser printer 100. The motor control device according to the present invention may alternatively be mounted on image forming apparatuses including printers employing another system such as an inkjet printer, copiers, scanners, facsimile machines, and multifunction machines.

Further, the use of the motor control device according to the present invention is not limited to image forming apparatuses. In any system in which the temperature of the motor is estimated from an output of the motor, it is advantageous to use the motor control device according to the present invention for its estimation processing.

(B) The functional units 311, 312, and 313 of the motor control device 310 illustrated in FIG. 3 are embedded as dedicated hardware into the electronic circuit. Alternatively, these functional units 311-313 may be embodied by a CPU built in the motor control device 310 executing a dedicated firmware.

(C) The motor 330 illustrated in FIG. 3 is a BLDC motor. Alternatively, the motor control device according to the present invention is effective as long as the motor is a DC motor even if the motor is a brushed motor. Further alternatively, even when a motor other than a DC motor such as a synchronous motor and an induction motor is used, it is effective to estimate the amount of rise in temperature of the motor by the LPF according to the present invention as long as power loss can be estimated.

(D) The measuring unit 331 calculates the coefficients $c_2[N], \ldots$ in Eq. (1), the relational equation between the duty ratio d for PWM control and the measured value PL of power loss of the motor 330, from the target value Ntg of the rotation rate set by the rate control unit 321. Alternatively, the measuring unit 331 may calculate these coefficients $c_2[N], \ldots$ from the value Nms of the rotation rate measured by the detector unit 323. The correspondence relationship between these coefficients $c_2[N], \ldots$ and the rotation rate N of the motor may be in advance tabulated and stored in a memory that is, together with the measuring unit 331, embedded into an electronic circuit.

Regarding the parameter d[N] in Eq. (1), only a value d[N0] at a specific rotation rate N0 may be stored in the memory. In this case, the measuring unit 331 may calculate a value d[N=Ntg, Nms] at the target value Ntg or the measured value Nms relative to the specific rotation rate N0 from the value d[N0] and a ratio of the target value Ntg or the measured value Nms to the specific rotation rate N0.

(E) The measuring unit 331 averages the duty ratios that the voltage instruction DTY indicates at predetermined time intervals to estimate power loss. Alternatively, the measuring unit may use the sum of the duty ratios at predetermined time intervals to estimate power loss. Further alternatively, when the load fluctuation is sufficiently slow and fluctuation of the measured value of power loss caused by the load fluctuation is within an acceptable error range, the measuring unit may use the duty ratio independently to measure a power loss without averaging or summing the duty ratios. Yet alternatively, the measuring unit may first calculate the measured value of power loss from the duty ratio, store therein a plurality of calculation results, and then enter the average value or the sum of the calculation results to the LPF 332.

(F) The LPF 332 calculates the estimated amount Tr of rise in temperature by using the thermal model (5). This estimated amount Tr corresponds to the amount of rise in temperature. However, the output of the LPF only needs to be a linear function, i.e. the sum of a term proportional to the amount of rise in temperature and a constant term. In this case, the amount of rise in temperature is easily converted from the output of the LPF. Conversely, a threshold value of the output is also easily converted from the threshold value of the amount of rise in temperature.

For example, the output of the LPF may be represented by, instead of the amount Tr of rise in temperature, a ratio Tr/Rh of the amount Tr of rise in temperature to the thermal resistance Rh. In this case, as clear from Eq. (8), the first filter coefficient $a_0$ and the second filter coefficient $a_1$ are each a dimensionless quantity and a positive real number less than one, like the third filter coefficient $b_1$. Thus, calculation of these coefficients is easily simplified for example owing to availability of the fixed point arithmetic.

(G) The notification unit 313 regards the estimated amount of rise in temperature of the motor as the difference between the acceptable upper limit of the ambient temperature of the motor and the temperature of the motor itself. Alternatively, when a temperature sensor is mounted on the printer, the notification unit may estimate the temperature of the motor itself from the sum of a value measured by the temperature sensor and the estimated amount of rise in temperature. In this case, different threshold values of the amount of rise in temperature can be set for different ambient temperatures, and thus the accuracy of having found a risk of overheating of the motor can be further enhanced. Especially, the frequency of reducing the rotation rate of the motor can be reduced without overheating the motor, and thus high levels of both the productivity and the operability of the printer can be maintained.

(H) When requesting the main controller unit 60 to change operation modes in response to exceeding of the threshold value by the estimated amount of rise in temperature, the notification unit 313 may also request the main controller unit 60 to notify a user of the change for example by display on the operation panel 51.

The notification unit 313 may cause the main controller unit 60 to store a history relating to the exceeding of the threshold value by the estimated amount of rise in temperature, in the ROM 63 of the main controller unit 60 or an external storage device via the memory I/F 52. This history is advantageous for use in maintenance of the printer 100. Further, whenever the estimated amount of rise in temperature exceeds the threshold value, the notification unit 313 may cause the main controller unit 60 to report the exceeding to a server or the like on an external network NTW via the LAN I/F 53. Alternatively, a history relating to the exceeding may be periodically reported.

Embodiment 2

A motor control device according to embodiment 2 of the present invention is mounted on a color laser printer, like the motor control device 310 according to embodiment 1. This motor control device differs from the motor control device 310 according to embodiment 1 only in configuration of the estimation unit, and includes other elements similar to those in embodiment 1. Accordingly, the following explains only the difference in the estimation unit, and incorporates the explanation of embodiment 1 for the similar elements.

The estimation unit 312 according to embodiment 1 has the measuring unit 331 measure power loss of the motor 330 from the duty ratios d controlled by the PWM unit 321, and has the LPF 332 integrate the measured values PL. In contrast, an estimation unit according to embodiment 2 has an LPF integrate the duty ratios themselves without using the measuring unit, as explained below.

Figure 8:
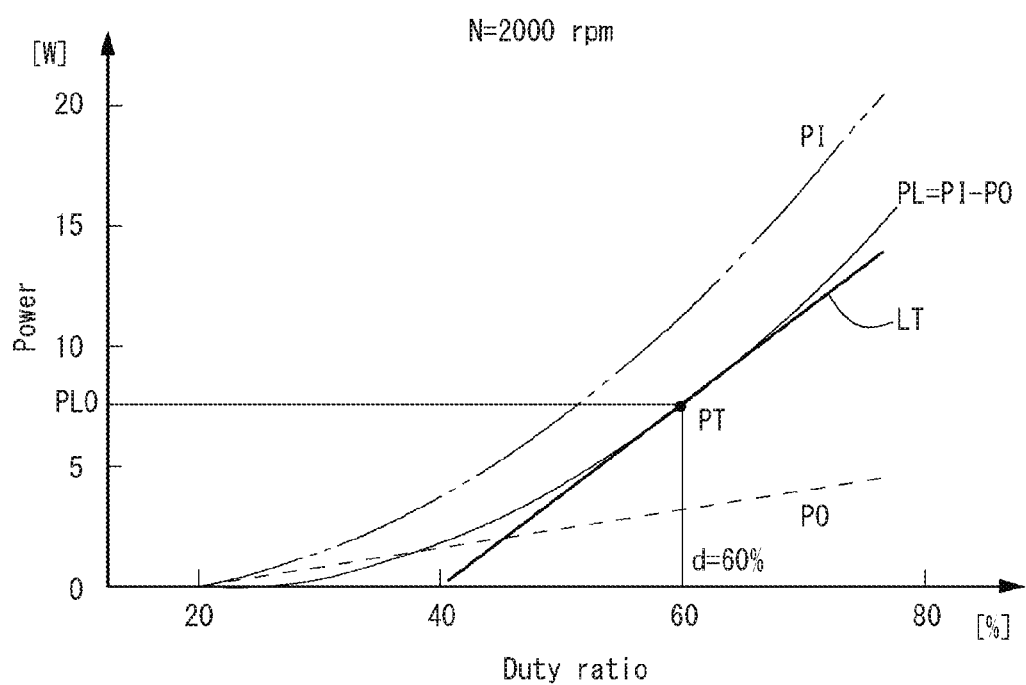
FIG. 8 is a graph illustrating relationships in PWM control of a motor between its duty ratios and approximate values of power loss, the relationships used by a LPF according to embodiment 2 of the present invention.

FIG. 8 is a graph illustrating relationships in PWM control between the duty ratios d and approximate values PM of power loss of the motor 330. The relationships are used by the LPF according to embodiment 2. Referring to FIG. 8, the relationships are represented by a straight line LT. The straight line LT is tangent at a point PT to a quadratic curve (see Eq. (1)) that more accurately represents the power loss PL. In other words, the duty ratios d and the approximate values PM of power loss of the motor satisfy the following equation, Eq. (9):

$$PM=(2c_2[N]d_0+c_1[N])(d-d_0)+PL_0=C_1d+C_0, C_1=2c_2[N]d_0+c_1[N], C_0=(2c_2[N]d_0+c_1[N])d_0+PL_0. \quad (9)$$

The constants $d_0$ and $PL_0$ represent the duty ratio and power loss at the tangent point PT, respectively. The coefficients $c_2[N]$ and $c_1[N]$ are equal to those in Eq. (1).

The LPF uses, instead of Eq. (5), the following equation, Eq. (10), as the thermal model of the motor to estimate an amount $Tr_m[i]$ of rise in temperature of the motor from a sample $d[i]$ of the duty ratio:

$$Tr_m = a_{m0} \cdot d[i] + a_{m1} \cdot d[i-1] + b_1 \cdot Tr_m[i-1]. \quad (10)$$

The third filter coefficient $b_1$ is equal to that in Eq. (5). The first filter coefficient $a_{m0}$, the second filter coefficient $a_{m1}$, and the amount $Tr_m[i]$ of temperature rise relate to the filter coefficients and amount $Tr[i]$ of temperature rise in Eq. (5), and the coefficients $C_1$ and $C_0$ in Eq. (9) as represented by the following equation, Eq. (11):

$$a_{m0}=a_{m1}=a_0\cdot C_1, (1-b_1)Tr_0=2a_0\cdot C_0, Tr_m[i]=Tr[i]-Tr_0 \quad (11)$$

As is clear from FIG. 8, deviation of approximate values PM from more accurate measured values PL is tiny in the vicinity of the tangent point PT. Accordingly, the LPF sets the duty ratio $d_0$ of the tangent point PT to a value that the driver circuit most frequently uses in the normal operations, 60% in the example shown in FIG. 8. When load fluctuation is sufficiently small to cause duty ratios d to slightly deviate from the value $d_0$ (for example, 60%) of the tangent point PT, temperature rise amounts $Tr_m[i]$ estimated by Eq. (10) are correct to a high level of accuracy that allows the estimated amounts to be used for protection of the motor from overheat.

Advantages of Embodiment 2

The motor control device according to embodiment 2 of the present invention, as discussed above, estimates amounts of rise in temperature of the motor by using the thermal model of the motor, like the motor control device 310 according to embodiment 1. Accordingly, the motor control device has high accuracy of estimating amounts of temperature rise. This enables the motor to continue operation without overheat. As a result, the motor control device can maintain high levels of both reliability and productivity for job processing.

Furthermore, the estimation unit according to embodiment 2 has the LPF use the thermal model (10) to integrate the duty ratios d, as discussed above. This can omit calculating power loss of the motor from the duty ratios by Eq. (1), i.e., can eliminate the measuring unit 331, in contrast to the estimation unit 312 according to embodiment 1. As a result, the estimation unit can improve the simplicity of processing and configuration necessary for estimating amounts of temperature rise.

Embodiment 3

A motor control device according to embodiment 3 of the present invention is mounted on a color laser printer, like the motor control device 310 according to embodiment 1. This motor control device differs from the motor control device 310 according to embodiment 1 only in configuration of the LPF, and includes other elements similar to those in embodiment 1. Accordingly, the following explains only the difference in the LPF, and incorporates the explanation of embodiment 1 for the similar elements.

The LPF 332 according to embodiment 1 uses the filter coefficients $a_0$, $a_1$, and $b_1$ in Eq. (8) both while the motor 330 operates and while it is at rest. This is because the motor 330 is approximated both for an operating period and for a rest period by the thermal model (6) to a sufficiently high level of accuracy, and especially the motor for each period has a time constant $\tau_A$, i.e. the product of a thermal resistance Rh and a thermal capacitance Ch, $\tau_A = RhCh = 1/\omega_A$, sufficiently close to the time constant of the thermal model. In contrast, an LPF according to embodiment 3 uses different thermal models, especially different filter coefficients, while the motor 330 operates and while it is at rest; the difference between the thermal models corresponds to the difference in rate of thermal response of the motor 330 between during operation and during rest, as explained below.

Figure 9:
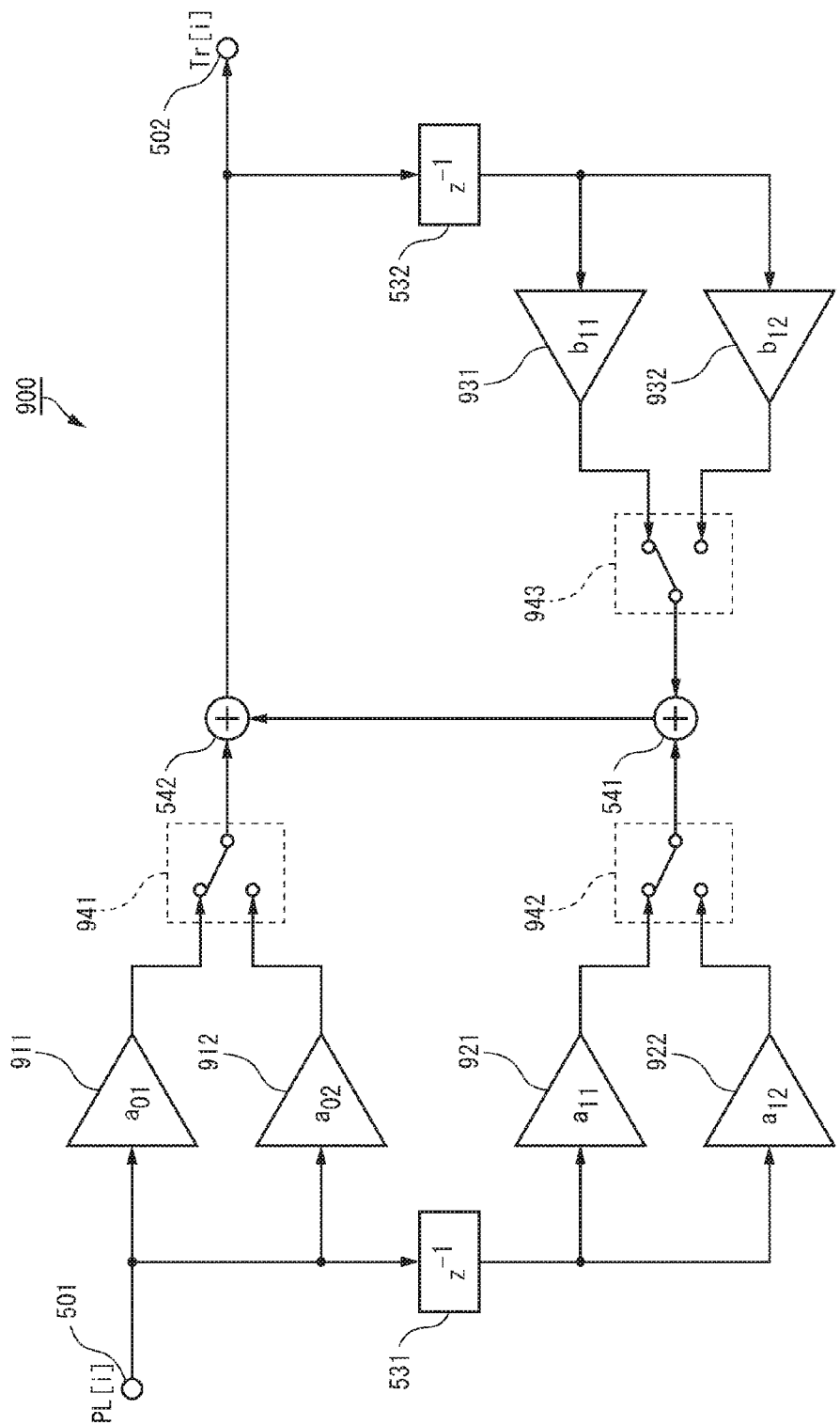
FIG. 9 is a block diagram of a LPF according to embodiment 3 of the present invention.

FIG. 9 is a block diagram of an LPF 900 according to embodiment 3. Referring to FIG. 9, this LPF 900, in contrast to the LPF 332 illustrated in FIG. 5A, doubles the number of each multiplier and includes three additional switches 941, 942, and 943. Other elements illustrated in FIG. 9 are similar to those illustrated in FIG. 5A. Accordingly, for these elements, the same reference numerals as in FIG. 5A are assigned and the explanation of FIG. 5A is incorporated.

A first main multiplier 911 and a first sub multiplier 912 differ from each other only in first filter coefficient, $a_{01}$ and $a_{02}$. Whenever receiving a sample PL[i] from the input terminal 501, the multipliers 911 and 912 calculate the products of the sample and their respective first filter coefficients $a_{01}$ and $a_{02}$, and send the products to the first switch 941.

A second main multiplier 921 and a second sub multiplier 922 differ from each other only in second filter coefficient, $a_{11}$ and $a_{12}$. Whenever receiving a one-interval, 1-Ts, prior sample PL[i-1] from the first delayer 531, the multipliers 921 and 922 calculate the products of the sample and their respective second filter coefficients $a_{11}$ and $a_{12}$, and send the products to the second switch 942.

A third main multiplier 931 and a third sub multiplier 932 differ from each other only in third filter coefficient, $b_{11}$ and $b_{12}$. Whenever receiving a one-interval, 1-Ts, prior estimated amount Tr[i-1] from the second delayer 532, the multipliers 931 and 932 calculate the products of the amount and their respective third filter coefficients $b_{11}$ and $b_{12}$, and send the products to the third switch 943.

The three switches 941, 942, and 943 each distinguish between the operating period and the rest period of the motor by checking whether or not the value of power loss of the motor measured by the measuring unit is equal to zero. The switches 941, . . . select outputs of the main multipliers 911, 921, and 931 during the operating period, and outputs of the sub multipliers 912, 922, and 932 during the rest period. Furthermore, the first switch 941 sends the selected output to the second adder 542, and the second switch 942 and the third switch 943 both send the selected outputs to the first adder 541.

With the above-described configuration, the LPF 900 estimates amounts Tr[i] of temperature rise by using different thermal models during the operating period and during the rest period. The first thermal model for the operating period, heating model, and the second one for the rest period, cooling model, are represented by the following equations, Eqs. (12) and (13), respectively:

$$Tr[i]=a_{01}\cdot PL[i]+a_{11}\cdot PL[i-1]+\cdot Tr[i-1], \quad (12)$$

$$Tr[i]=a_{02}\cdot PL[i]+a_{12}\cdot PL[i-1]+b_{12}\cdot Tr[i-1]. \quad (13)$$

The filter coefficients $a_{01}$, $a_{11}$, and $b_{11}$ of the heating model (12) are determined from the time constant $\tau_{A1}$ of thermal response during the operating period of the motor; the filter coefficients $a_{02}$, $a_{12}$, and $b_{12}$ of the cooling model (13) are determined from the time constant $\tau_{A2}$ of thermal response during the rest period of the motor; those are represented by the following equations, Eq. (14):

$$a_{01} = a_{11} = Rh_1 \frac{\frac{Ts}{2\tau_{A1}}}{1+\frac{Ts}{2\tau_{A1}}}, \quad b_{11} = \frac{1-\frac{Ts}{2\tau_{A1}}}{1+\frac{Ts}{2\tau_{A1}}}, \quad (14)$$

$$\tau_{A1} = Rh_1 \cdot Ch_1, \quad \frac{Ts}{2\tau_{A1}} = \tan\frac{Ts}{2\tau_{D1}},$$

$$a_{02} = a_{12} = Rh_2 \frac{\frac{Ts}{2\tau_{A2}}}{1+\frac{Ts}{2\tau_{A2}}}, \quad b_{12} = \frac{1-\frac{Ts}{2\tau_{A2}}}{1+\frac{Ts}{2\tau_{A2}}},$$

$$\tau_{A2} = Rh_2 \cdot Ch_2, \quad \frac{Ts}{2\tau_{A2}} = \tan\frac{Ts}{2\tau_{D2}},$$

The constants $Rh_1$ and $Ch_1$ represent the thermal resistance and thermal capacitance for the operating period of the motor, respectively. The constants $Rh_2$ and $Ch_2$ represent the thermal resistance and thermal capacitance for the rest period of the motor, respectively. The constants $\tau_{D1}$ and $\tau_{D2}$ represent the time constants of the LPF 900 for the operating period and for the rest period, respectively.

Advantages of Embodiment 3

The motor control device according to embodiment 3 of the present invention, as discussed above, uses the two different thermal models (12) and (13) for estimating amounts of rise in temperature of the motor while it operates and while it is at rest. This enables the motor control device, even if processing intermittent jobs makes the motor 330 frequently repeat operating and stopping, to maintain high accuracy of estimating amounts of rise in temperature of the motor throughout the whole period of processing the jobs. In this way, the motor control device enables the motor to continue operations without overheat, and thus can maintain high levels of both reliability and productivity for job processing.

Embodiment 4

A motor control device according to embodiment 4 of the present invention is mounted on a color laser printer, like the motor control device 310 according to embodiment 1. This motor control device differs from the motor control device 310 according to embodiment 1 only in part of the motor control procedure, and includes other elements similar to those in embodiment 1. Accordingly, the following explains only the difference in the flow of the control, and incorporates the explanation of embodiment 1 for the similar elements.

The motor control according to embodiment 1, as illustrated in FIG. 7, when the notification unit 313 confirms in step S105 that an estimated amount of temperature rise exceeds the threshold value, immediately proceeds to step S106. Then, the notification unit 313 checks whether or not there exists an operation mode in which the motor 330 keeps a lower rotation rate than in the current operation mode. In contrast, the motor control according to embodiment 4, even when an estimated amount of temperature rise exceeds the threshold value, as long as time shorter than a certain length remains before processing jobs is finished, has the motor continue operations without having the notification unit send any request for change of operation mode; the certain length of time is predicted to elapse before the motor actually overheats.

Figure 10:
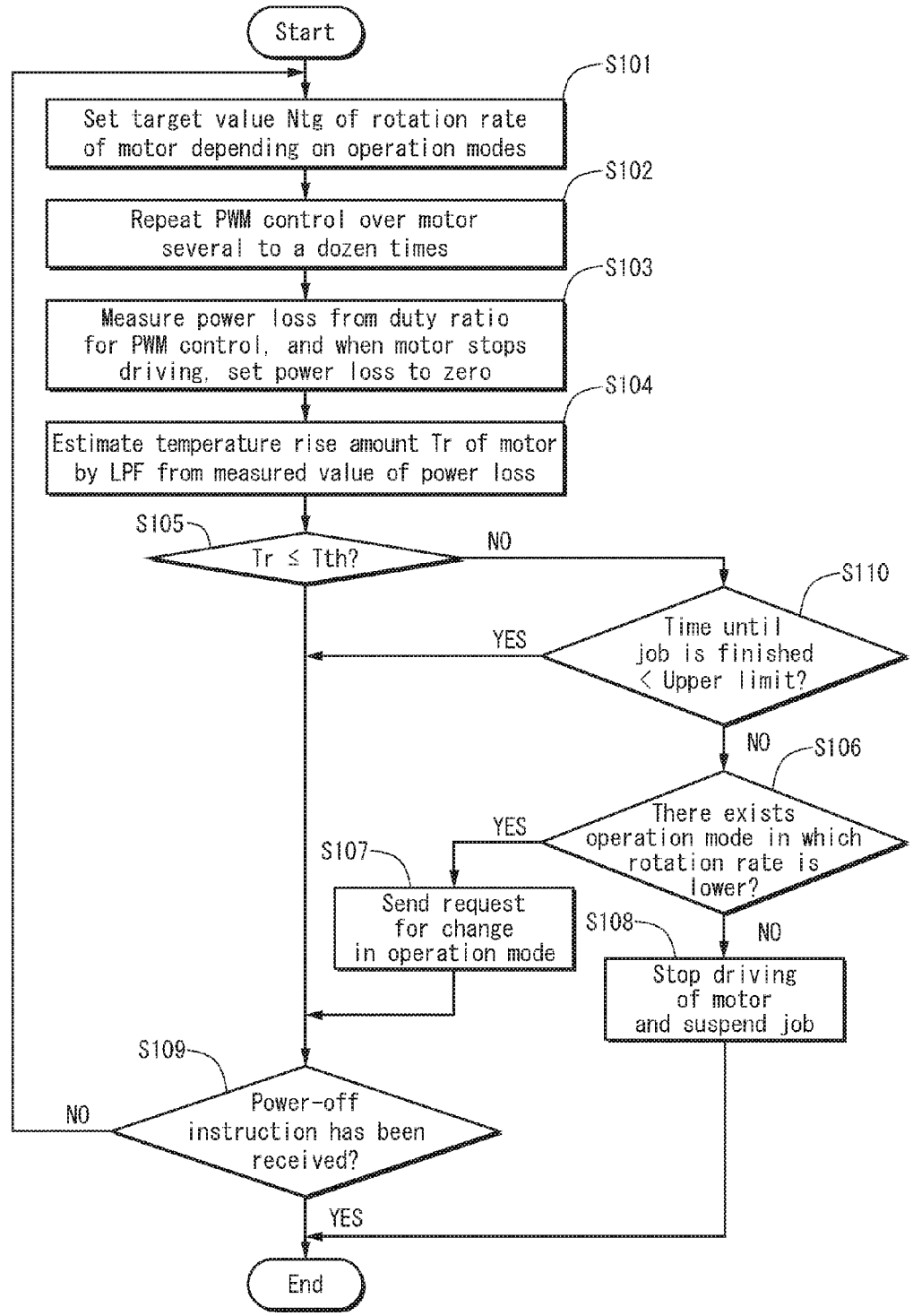
FIG. 10 is a flow chart of motor control according to embodiment 4 of the present invention.

FIG. 10 is a flow chart of the motor control according to embodiment 4. This procedure differs from that illustrated in FIG. 7 only in step S110 inserted between step S105 and step S106. Other steps are similar to those in embodiment 1. Accordingly, the following explains details of the different step S110, and incorporates the explanation of embodiment 1 for details of the similar steps.

In step S101, the rotation rate of the motor 330 is set to a target value Ntg depending on operation modes. Then, the motor control proceeds to step S102.

In step S102, PWM control over the motor 330 is repeated several to a dozen times. Then, the motor control proceeds to step S103.

In step S103, power loss of the motor 330 is measured from the duty ratio that the voltage instruction DTY indicates. For example, when stop of the motor 330 is detected from the duty ratio equal to zero, the measured value is set to zero. Then, the motor control proceeds to step S104.

In step S104, the LPF 332 uses the thermal model (5) of the motor 330 to estimate an amount of rise in temperature of the motor 330. Then, the motor control proceeds to step S105.

In step S105, the estimated amount Tr of temperature rise is checked whether or not to exceed the threshold value Tth. When the estimated amount Tr is equal to the threshold value Tth or less, the motor control proceeds to step S109. When the estimated amount Tr exceeds the threshold value Tth, the motor control proceeds to step S110.

In step S110, the estimated amount Tr of temperature rise exceeds the threshold value Tth, and then the notification unit 313 inquires the main controller unit 60 to check whether or not time shorter than an acceptable upper limit remains before processing jobs is finished. The "acceptable upper limit" is the sum of a certain time and a margin. The certain time is predicted to elapse from when the estimated amount Tr of temperature rise exceeds the threshold value Tth until when the motor 330 actually overheats. The margin is based on estimation errors.

In response to the inquiry from the notification unit 313, the main controller unit 60 first counts how many sheets now remain unprinted among the number of sheets required by current jobs. From the number of unprinted sheets and current processing speeds, the main controller unit 60 next predicts the length of remaining time before processing the jobs is finished, and then returns the predicted length to the notification unit 313. When the length is shorter than the acceptable upper limit, the motor control proceeds to step S109. When the length is equal to the acceptable upper limit or more, the motor control proceeds to step S106.

When the processing speeds are independent of operation modes, the notification unit 313 may convert the acceptable upper limit into the number of sheets printable at the processing speeds, and then compare the number of printable sheets with the number of unprinted sheets.

In step S106, time equal to the acceptable upper limit or more remains before processing the jobs is finished, and thus continuation of processing the jobs might cause the motor 330 to overheat before processing the jobs is finished. Accordingly, the notification unit 313 checks whether or not there exists an operation mode in which the motor 330 keeps a lower rotation rate than in the current operation mode. If such an operation mode exists, the motor control proceeds to step S107. If not, the control proceeds to step S108.

In step S107, there still remains an operation mode in which the motor 330 keeps a lower rotation rate than in the current operation mode, and thus the notification unit 313 requests the main controller unit 60 to switch to the remaining operation mode. Then, the motor control proceeds to step S109.

In step S108, there remains no operation mode in which the motor 330 keeps a lower rotation rate than in the current operation mode, and thus the notification unit 313 has the controller unit 311 stop the motor 330, and has the main controller unit 60 suspend processing the jobs. In this way, the motor 330 is prevented from overheat. Then, the motor control ends.

In step S109, the estimated amount Tr of temperature rise is equal to the threshold value Tth or less, or alternatively time shorter than the acceptable upper limit remains before processing the jobs is finished. Accordingly, continuation of processing the jobs has no risk of overheating the motor 330, or processing the jobs will be finished before the motor 330 overheats. Thus, the controller unit 311 checks whether or not it has received an instruction to power off the printer 100. If the controller unit 311 has received the instruction, the motor control ends. If not, the control is repeated from step S101.

Advantages of Embodiment 4

The motor control device according to embodiment 4 of the present invention estimates amounts of rise in temperature of the motor by using the thermal model of the motor, like the motor control device 310 according to embodiment 1. Accordingly, the motor control device has high accuracy of estimating amounts of temperature rise. This enables the motor to continue operation without overheat. As a result, the motor control device can maintain high levels of both reliability and productivity for job processing.

Especially even if an estimated amount of temperature rise exceeds the threshold value, as long as remaining time before the jobs are finished is shorter than the acceptable upper limit, the motor control device according to embodiment 4 has the motor continue operation without sending any request for change of operation mode. In other words, the printer can finish processing the jobs before the motor overheats, and thus the motor control device has the printer continue to process the jobs without change of operation mode. This avoids delay of processing the jobs due to change of operation mode without causing the motor to overheat, and thus the motor control device can maintain higher productivity.

Embodiment 5

A motor control device according to embodiment 5 of the present invention is mounted on a color laser printer, like the motor control device 310 according to embodiment 1. This motor control device differs from the motor control device 310 according to embodiment 1 only in part of the motor control procedure, and includes other elements similar to those in embodiment 1. Accordingly, the following explains only the different part of the motor control procedure, and incorporates the explanation of embodiment 1 for the similar elements.

The motor control according to embodiment 1, when an estimated amount of temperature rise exceeds the threshold value, requests change of operation mode to reduce the rotation rate of the motor. In contrast, the motor control according to embodiment 5 requests change of operation mode to enlarge intervals of feeding sheets.

Generally, longer intervals of feeding sheets put lighter average loads on the motors. For example, the conveyance rollers are not in contact with sheets for longer time. Only when the conveyance rollers are in contact with sheets, the motors driving the conveyance rollers are under heavy load. Thus, lighter time-averaged load puts on the motors. As illustrated in FIG. 6, the motors generating lower torque lose less power. Therefore, the lighter average load indicates smaller average amounts of heat that the motors generate.

The motor control device according to embodiment 5 accordingly, when an estimated amount of temperature rise exceeds the threshold value, changes the current operation mode to an operation mode in which sheets are fed at longer intervals than in the current operation mode. This reduces the average amounts of heat that the motors generate, and thus reduces the rates of rise in temperature of the motors.

Figure 11:
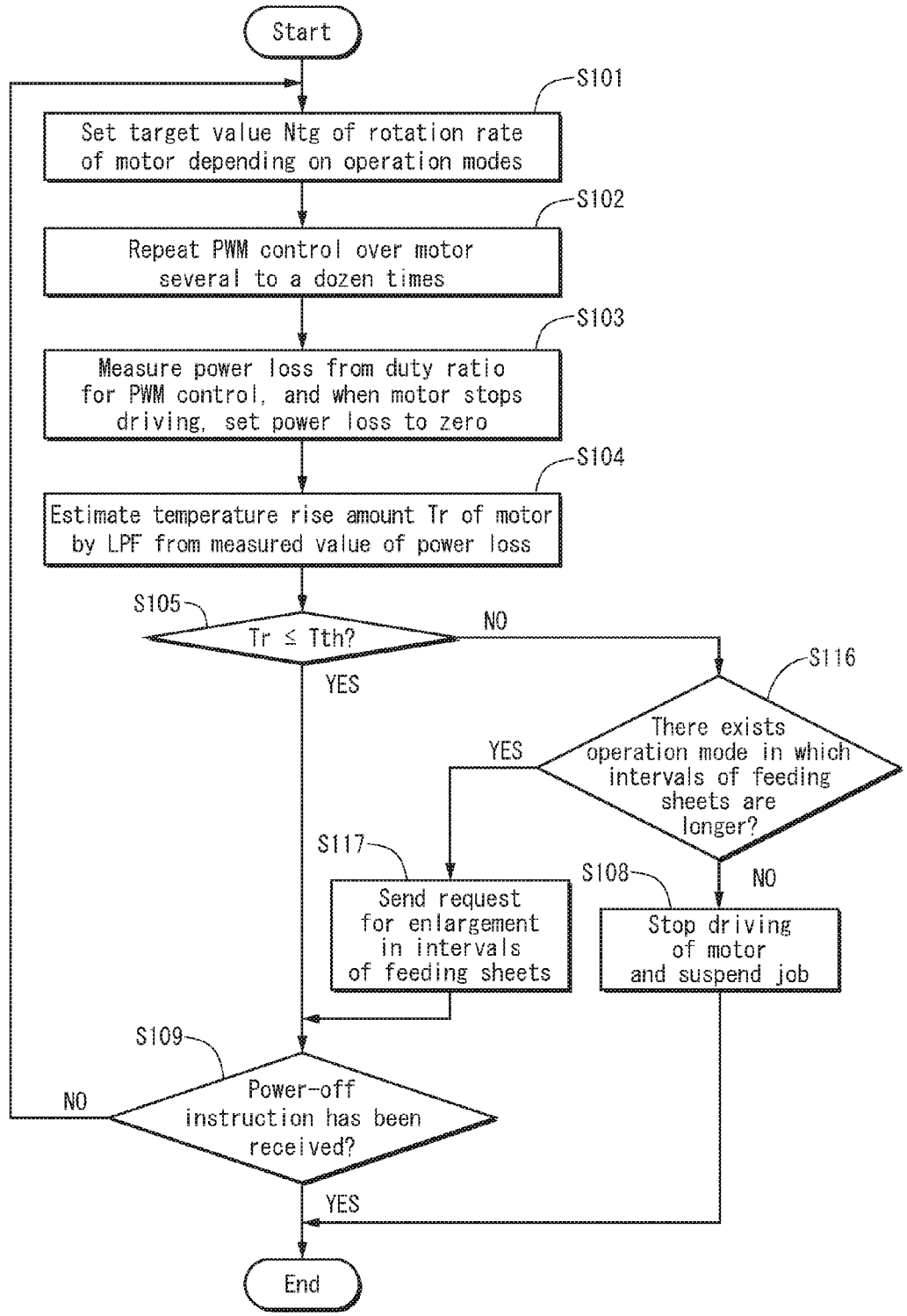
FIG. 11 is a flow chart of motor control according to embodiment 5 of the present invention.

FIG. 11 is a flow chart of motor control according to embodiment 5. This procedure differs from that illustrated in FIG. 7 only in steps S116 and S117 instead of steps S106 and S107, respectively. Other steps in this procedure are similar to those in embodiment 1. Accordingly, the following explains details of only steps S116 and S117, and incorporates the explanation of embodiment 1 for details of the similar steps.

In step S101, the rotation rate of the motor 330 is set to a target value Ntg depending on operation modes. Then, the motor control proceeds to step S102.

In step S102, PWM control over the motor 330 is repeated several to a dozen times. Then, the motor control proceeds to step S103.

In step S103, power loss of the motor 330 is measured from the duty ratio that the voltage instruction DTY indicates. For example, when stop of the motor 330 is detected from the duty ratio equal to zero, the measured value is set to zero. Then, the motor control proceeds to step S104.

In step S104, the LPF 332 uses the thermal model (5) of the motor 330 to estimate the amount of rise in temperature of the motor 330. Then, the motor control proceeds to step S105.

In step S105, the estimated amount Tr of temperature rise is checked whether or not to exceed the threshold value Tth. When the estimated amount Tr is equal to the threshold value Tth or less, the motor control proceeds to step S109. When the estimated amount Tr exceeds the threshold value Tth, the motor control proceeds to step S116.

In step S116, the estimated amount Tr of temperature rise exceeds the threshold value Tth, and then the notification unit 313 checks whether or not available operation modes include one in which sheets are fed at longer intervals than in the current operation mode. If such an operation mode exists, the motor control proceeds to step S117. If not, the motor control proceeds to step S108.

In step S117, there still remains an operation mode in which sheets are fed at longer intervals than in the current operation mode. Accordingly, the notification unit 313 sends a request for change of operation mode to the main controller unit 60 to have the main controller unit 60 switch to the operation mode in which sheets are fed at longer intervals than in the current operation mode. Then, the motor control proceeds to step S109.

In step S108, there remains no operation mode in which sheets are fed at longer intervals than in the current operation mode. Accordingly, the notification unit 313 has the controller unit 311 stop the motor 330, and has the main controller unit 60 suspend processing the jobs. In this way, the motor 330 is prevented from overheat. Then, the motor control ends.

In step S109, the estimated amount Tr of temperature rise is equal to the threshold value Tth or less, or alternatively time shorter than the acceptable upper limit remains before processing the job is finished. Accordingly, continuation of processing the jobs has no risk of overheating the motor 330, or processing the jobs will be finished before the motor 330 overheats. Thus, the controller unit 311 checks whether or not it has received an instruction to power off the printer 100. If the controller unit 311 has received the instruction, the motor control ends. If not, the control is repeated from step S101.

Advantages of Embodiment 5

The motor control device according to embodiment 5 of the present invention estimates amounts of rise in temperature of the motor by using the thermal model of the motor, like the motor control device 310 according to embodiment 1. Accordingly, the motor control device has high accuracy of estimating amounts of temperature rise.

When an estimated amount of temperature rise exceeds the threshold value, the notification unit 313 requests the main control unit to switch to an operation mode in which the intervals of feeding sheets are longer. Switching to the operation mode has the motor generate a smaller amount of heat, and thus avoid the risk of overheat. Furthermore, enlargement of the intervals of feeding sheets lowers the rate of the temperature rise, and thus extends the length of the time when estimated amounts of the temperature rise are equal to the threshold value or less. For this extended time, the motor control device enables the printer to continue operations with use of the motor. In this way, the motor control device enables the motor to continue operations without overheat, and thus can maintain high levels of both reliability and productivity for job processing.

Embodiment 6

A motor control device according to embodiment 6 of the present invention is mounted on a color laser printer, like the motor control device 310 according to embodiment 1. This motor control device differs from the motor control device 310 according to embodiment 1 only in part of motor control procedure, and includes other elements similar to those in embodiment 1. Accordingly, the following explains only the different part of the motor control procedure, and incorporates the explanation of embodiment 1 for the similar elements.

The motor control according to embodiment 1, as illustrated in FIG. 7, when there exists no operation mode in which the motor keeps a lower rotation rate than in the current operation mode, immediately suspends processing the jobs and then ends processing. In contrast, the motor control according to embodiment 6 continues processing even after the printer suspends processing the jobs. When a predetermined length of time has elapsed after the printer suspends processing the jobs, or when an estimated amount of temperature rise drops to the threshold value or less, the motor control has the printer restart processing the jobs.

FIG. 12 is a flow chart of the motor control according to embodiment 6. This procedure differs from that illustrated in FIG. 7 only in step S121 inserted between step S108 and step S109. Other steps in this procedure are similar to those in embodiment 1. Accordingly, the following explains details of only step S121, and incorporates the explanation of embodiment 1 for details of the similar steps.

In step S101, the rotation rate of the motor 330 is set to a target value Ntg depending on operation modes. Then, the motor control proceeds to step S102.

In step S102, PWM control over the motor 330 is repeated several to a dozen times. Then, the motor control proceeds to step S103.

In step S103, power loss of the motor 330 is measured from the duty ratio that the voltage instruction DTY indicates. For example, when stop of the motor 330 is detected from the duty ratio equal to zero, the measured value is set to zero. Then, the motor control proceeds to step S104.

In step S104, the LPF 332 uses the thermal model (5) of the motor 330 to estimate an amount of rise in temperature of the motor 330. Then, the motor control proceeds to step S105.

In step S105, the estimated amount Tr of temperature rise is checked whether or not to exceed the threshold value Tth. When the estimated amount Tr is equal to the threshold value Tth or less, the motor control proceeds to step S109. When the estimated amount Tr exceeds the threshold value Tth, the motor control proceeds to step S106.

In step S106, the estimated amount Tr of temperature rise exceeds the threshold value Tth, and thus the notification unit 313 checks whether or not there exists an operation mode in which the motor 330 keeps a lower rotation rate than in the current operation mode. If such an operation mode exists, the motor control proceeds to step S107. If not, the control proceeds to step S108.

In step S107, there still remains an operation mode in which the motor 330 keeps a lower rotation rate than in the current operation mode, and thus the notification unit 313 requests the main controller unit 60 to switch to the remaining operation mode. Then, the motor control proceeds to step S109.

In step S108, there remains no operation mode in which the motor 330 keeps a lower rotation rate than in the current operation mode, and thus the notification unit 313 has the controller unit 311 cut off power supply to the motor 330, and has the main controller unit 60 suspend processing the jobs. In this way, the motor 330 is prevented from overheat. Then, the motor control proceeds to step S121.

In step S121, the notification unit 313 judges whether the job processing suspended in step S108 is to be restarted. There are the two following conditions for restarting the job processing: (A) the length of time during which the job processing is suspended reaches a predetermined value; and (B) an estimated amount of temperature rise drops to the threshold value or less during the time. When either of the conditions is satisfied, the notification unit 313 sends a request for restart of the job processing to the main controller unit 60. Then, the motor control proceeds to step S109.

In step S109, the estimated amount Tr of temperature rise is equal to the threshold value Tth or less, and thus there is no risk of overheating the motor 330 even if the jobs continue to be processed. Thus, the controller unit 311 checks whether or not it has received an instruction to power off the printer 100. When the controller unit 311 has received the instruction, the motor control ends. If not, the control is repeated from step S101.

Figure 13A:
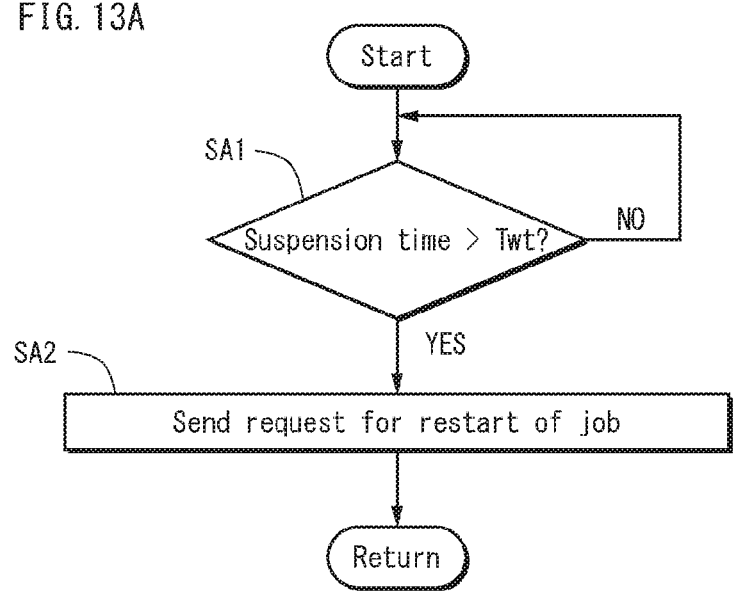
FIGS. 13A and 13B are two types of the flow chart of subroutine of step S121 illustrated in FIG. 12.

FIG. 13A is a flow chart of subroutine of step S121 illustrated in FIG. 12 when condition (A) is adopted as condition for restarting job processing: "the length of time during which the job processing is suspended reaches the predetermined value."

In step SA1, the notification unit 313 measures the length of time that elapses after the suspension of job processing, and checks whether or not the elapsed time exceeds a predetermined value Twt. This value Twt represents the length of time necessary for the motors overheating to so cool to resume operation. For example, the value Twt is set to the length of time necessary for an amount of rise in temperature of the motor to drop from the threshold value Tth to zero within an acceptable error range, i.e. for the temperature of the motor to substantially drop to the ambient temperature. When the elapsed time exceeds the predetermined value Twt, the motor control proceeds to step SA2. When the elapsed time is equal to the predetermined value or less, the control repeats step SA1.

In step SA2, the elapsed time from the suspension of job processing exceeds the predetermined value Twt. Accordingly, the motor is regarded as having cooled to resume, and thus the notification unit 313 sends a request for restart of jobs to the main controller unit 60. Then, the motor control returns from the subroutine to step S109 illustrated in FIG. 12.

Figure 13B:
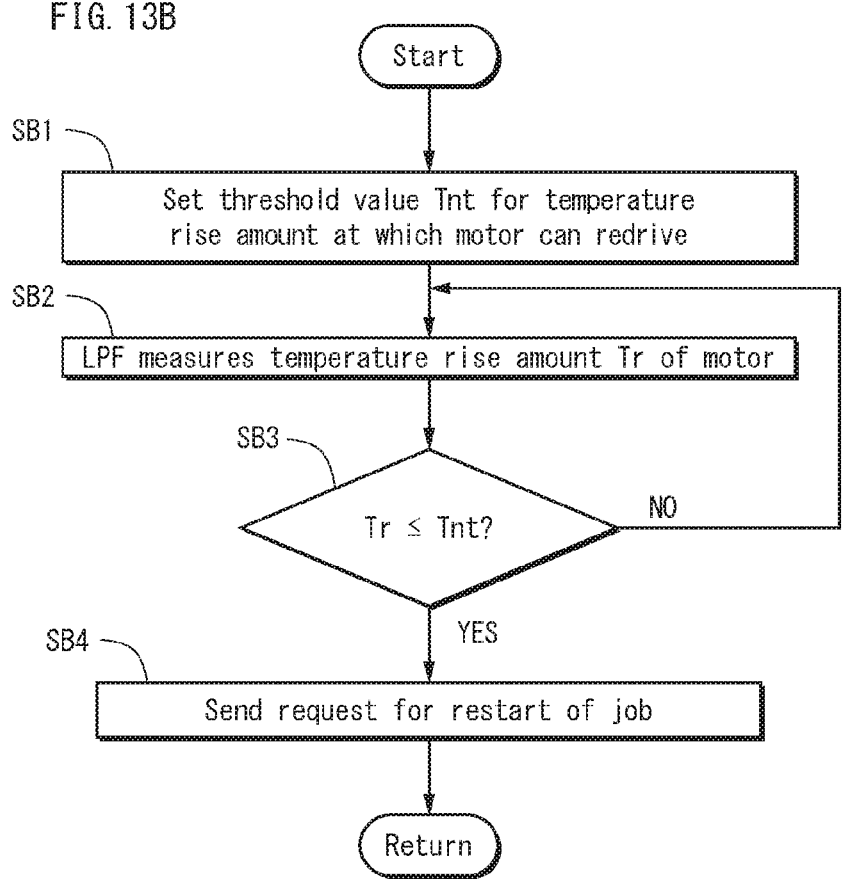

FIG. 13B is a flow chart of subroutine of step S121 illustrated in FIG. 12 when condition (B) is adopted as condition for restarting job processing: "an estimated amount of temperature rise drops to the threshold value or less during suspension of job processing."

In step SB1, the notification unit 313 sets a new threshold value Tnt for amount of rise in temperature of the motor a value at which the motor stopped in step S108 can resume. This new threshold value Tnt is equal to or less than the threshold value Tth at the suspension of job processing, and for example satisfies the following condition: "Even if processing a job is restarted, amounts of rise in temperature of the motor increase from the new threshold value Tnt to at most the threshold value Tth at the suspension of job processing, during the period after processing the job is restarted until it is finished." Then, the motor control proceeds to step SB2.

In step SB2, the LPF 332 uses the thermal model (5) of the motor to estimate amounts of rise in temperature of the motor. In other words, the LPF 332 integrates the input values PL[·]=0 for the thermal model at the sampling intervals Ts, and sends an integrated result as an estimated amount Tr of temperature rise to the notification unit 313. The sampling intervals Ts are set to values at which samples are traceable with a sufficient precision to fluctuations of amounts of temperature rise due to heat dissipation from the motor; the values are for example comparable with the time constant $\tau_A = R_h C_h$ of thermal response of the motor. Then, the motor control proceeds to step SB3.

In step SB3, the notification unit 313 compares the estimated amount Tr of temperature rise with the new threshold value Tnt to check whether the estimated amount Tr is equal to the threshold value Tnt or less. When the estimated amount Tr is equal to the threshold value Tnt or less, the motor control proceeds to step SB4. When the estimated amount Tr exceeds the threshold value Tnt, the control is repeated from step SB2.

In step SB4, the estimated amount Tr is equal to the threshold value Tnt or less, and thus, even if processing a job is restarted, until it is finished, there is no risk that the temperature rise increases so large that the motor needs to be stopped. Accordingly, the notification unit 313 sends a request for restart of processing jobs to the main controller unit 60. Then, the motor control returns from the subroutine to step S109 illustrated in FIG. 12.

Advantages of Embodiment 6

The motor control device according to embodiment 6 of the present invention estimates amounts of rise in temperature of the motor by using the thermal model of the motor, like the motor control device 310 according to embodiment 1. Accordingly, the motor control device has high accuracy of estimating amounts of temperature rise. This enables the motor to continue operations without overheat. As a result, the motor control device can maintain high levels of both reliability and productivity for job processing.

Even after stopping the motor in response to an estimated amount of rise in temperature of the motor exceeding the threshold value, the motor control device still continues to either measure the length of time that elapses or estimate amounts of rise in temperature of the motor. Either when the length of the elapsed time exceeds the predetermined value Twt, or when an estimated amount Tr of temperature rise drops to the new threshold value Tnt or below, the motor control device allows the printer to restart job processing; the new threshold value Tnt indicates the temperature of the motor that can resume operation.

The motor control device thus, when the motor seems to escape the risk of overheat and become able to resume operation, automatically allows the printer to restart jobs. This enhances operability of the printer without impairing the ability to protect the motor from overheat.

Embodiment 7

A motor control device according to embodiment 7 of the present invention is mounted on a color laser printer, like the motor control device 310 according to embodiment 1. This motor control device differs from the motor control device 310 according to embodiment 1 only in part of the motor control procedure, and includes other elements similar to those in embodiment 1. Accordingly, the following explains only the different part of the motor control procedure, and incorporates the explanation of embodiment 1 for the similar elements.

The motor control according to embodiment 1, when an estimated amount Tr of rise in temperature of the motor exceeds the threshold value Tth, reduces the rotation rate of the motor. In contrast, the motor control according to embodiment 7 first sets the threshold value Tth for temperature rise amount to the upper limit of a range into which a fan included in the printer to cool the motor can reduce amounts of rise in temperature of the motor. The motor control changes rotation rates of the fan according to differences or ratios between the threshold value Tth and the estimated amounts Tr.

FIG. 14 is a flow chart of the motor control according to embodiment 7. This procedure differs from that illustrated in FIG. 7 only in steps S141-S144 included instead of steps S106 and S107. Other steps in this procedure are similar to those in embodiment 1. Accordingly, the following explains details of only steps S141-S144, and incorporates the explanation of embodiment 1 for details of the similar steps.

In step S101, the rotation rate of the motor 330 is set to a target value Ntg depending on operation modes. Then, the motor control proceeds to step S102.

In step S102, PWM control over the motor 330 is repeated several to a dozen times. Then, the motor control proceeds to step S103.

In step S103, power loss of the motor 330 is measured from the duty ratio that the voltage instruction DTY indicates. For example, when stop of the motor 330 is detected from the duty ratio equal to zero, the measured value is set to zero. Then, the motor control proceeds to step S104.

In step S104, the LPF 332 uses the thermal model (5) of the motor 330 to estimate an amount of rise in temperature of the motor 330. Then, the motor control proceeds to step S105.

In step S105, the estimated amount Tr of temperature rise is checked whether or not to exceed the threshold value Tth. When the estimated amount Tr is equal to the threshold value Tth or less, the motor control proceeds to step S141. When the estimated amount Tr exceeds the threshold value Tth, the motor control proceeds to step S108.

In step S108, the estimated amount Tr of temperature rise exceeds the threshold value Tth, and thus the notification unit 313 has the controller unit 311 cut off power supply to the motor 330, and has the main controller unit 60 to suspend processing the jobs. In this way, the motor 330 is prevented from overheat. Then, the motor control ends.

In step S141, the estimated amount Tr of temperature rise is equal to the threshold value Tth or less, and thus there has been no risk of overheating the motor yet. Furthermore, the notification unit 313 checks whether the estimated amount Tr is equal to a first level or less. The first level is equal to the lower limit of a range of temperature rise amounts that require increase in the ability of the fan to cool the motor, i.e. rotation rates of the fan; the lower limit is, for example, 0.9 times the threshold value Tth. When the estimated amount Tr is equal to the first level or less, the motor control proceeds to step S142. When the estimated amount Tr exceeds the first level, the control proceeds to step S143.

In step S142, the estimated amount Tr of temperature rise is equal to or lower than the first level, for example 0.9 times the threshold value Tth, and thus the rotation rate of the fan does not need to be increased. The notification unit 313 further checks whether the estimated amount Tr is equal to a second level or less. The second level is equal to the upper limit of a range of temperature rise amounts that require reduction of rotation rates of the fan; the upper limit is, for example, 0.6 times the threshold value Tth. When the estimated amount Tr is equal to the second level or more, the motor control proceeds to step S109. When the estimated amount Tr is less than the second level, the control proceeds to step S144.

In step S143, the estimated amount Tr of temperature rise exceeds the first level, for example 0.9 times the threshold value Tth. Then, there is a risk that the temperature rise amount reaches the threshold value Tth. Accordingly, the notification unit 313 has the main controller unit 60 change operation modes to increase the rotation rate of the fan, and thus to further cool the motor or its surroundings. Then, the motor control proceeds to step S109.

The notification unit 313 also has the measuring unit 331 correct a measured value PL[·] of power loss according to the increase of the rotation rate of the fan. This correction is necessary because of the following reason. The increase in cooling ability of the fan increases an amount of heat dissipated from the motor, and accordingly increases an amount of heat generated by the motor, which is equal to an amount of heat stored in the motor plus the amount of heat dissipated from the motor, i.e. power loss of the motor. In order to cause the measured value PL[·] to reflect such an increase or decrease in power loss, the measured value PL[·] may be multiplied by a correction coefficient more or less than one, for example. Such a correction coefficient for each different rotation rate of the fan is determined in advance by experiments or simulations, and is stored in a memory that is, together with the measuring unit 331, embedded into an electronic circuit such as an ASIC and the FPGA.

In step S144, the estimated amount Tr of temperature rise is less than the second level, for example 0.6 times the threshold value Tth, and thus there is no risk that an amount of rise in temperature of the motor increases to the threshold value Tth even if the fan has a reduced cooling ability. Accordingly, the notification unit 313 has the main controller unit 60 change operation modes to reduce the rotation rate of the fan, and thus to reduce power consumption and noise of the fan. The notification unit 313 also has the measuring unit 331 change a correction amount for the measured value PL[·] of power loss according to the reduction of the rotation rate of the fan. For example, when the measured value PL[·] is to be multiplied by a correction coefficient, the notification unit 313 has the measuring unit 331 to reduce this correction coefficient. Then, the motor control proceeds to step S109.

In step S109, the controller unit 311 checks whether or not the main controller unit 60 has received an instruction to power off the printer 100. If the instruction has been received, the motor control ends. If not, the control is repeated from step S101.

Advantages of Embodiment 7

The motor control device according to embodiment 7 of the present invention estimates amounts of rise in temperature of the motor by using the thermal model of the motor, like the motor control device 310 according to embodiment 1. Accordingly, the motor control device has high accuracy of estimating amounts of temperature rise. This enables the motor to continue operations without overheat. As a result, the motor control device can maintain high levels of both reliability and productivity for job processing.

Furthermore, this motor control device changes the rotation rate of the fan included in the printer according to the difference or ratio between estimated amounts of rise in temperature of the motor and the threshold value. The motor control device thus enables the fan to efficiently cool the motor.

SUPPLEMENT

The motor control devices according to the above-described embodiments of the present invention use the thermal model of a motor to estimate an amount of rise in temperature of the motor from the input values of the motor that the device instructs to the driver circuit of the motor. This thermal model involves both amounts of heat stored in and dissipated from the motor, and thus the estimation unit can calculate estimated amounts of rise in temperature of the motor even while it stops driving. In addition, the input values of the motor reflect feedbacks of statuses of the motor and driver circuit and load fluctuations. These devices can thus enhance the accuracy of estimating an amount of rise in temperature of the motor regardless of repetition of intermittent drive of the motor and a variety of load fluctuations.

Based on the above-described embodiments, the present invention may be characterized as follows.

The motor control device may further comprise a detector unit configured to detect a rotation rate of the motor to be used as the output value of the motor, and a rate control unit configured to calculate a width of a pulse from the difference in rotation rate of the motor between a value detected by the detector unit and the target value depending on operation modes of the system, and to assign the width of the pulse as the input value for the motor. The pulse is to be applied to the motor by the driver circuit of the motor. In this case, the estimation unit may include an measuring unit configured to measure a power loss of the motor from a pulse width calculated by the rate control unit, and a low pass filter (LPF) configured to integrate power losses of the motor measured by the measuring unit with the thermal model of the motor to estimate the amount of rise in temperature of the motor. Alternatively, the estimation unit may include a LPF configured to integrate pulse widths of the motor calculated by the rate control unit with the thermal model of the motor to estimate the amount of rise in temperature of the motor.

The estimation unit may update estimation values at longer time intervals than the controller unit updates input values for the motor. Alternatively, the estimation unit may be equipped with two types of the thermal model of the motor, a heating model and a cooling model, and uses the heating model when the input value of the motor or the output value of the motor indicates driving of the motor, and uses the cooling model when the input value of the motor or the output value of the motor indicates stop of the motor. In addition, the operation modes of the system may include two or more modes differing in average power loss of the motor, and the notification unit arranges an order in which the system should change operation modes to reduce the average power loss of the motor stepwise, and instructs the system to change operation modes in the order by sending requests for change of operation mode to the system.

The main controller unit of the image forming apparatus, in response to the request for change of operation mode from the notification unit: may select an operation mode to be changed depending on the length of time before a job currently processed will be finished; may change operation modes to enlarge the intervals of feeding sheets, to reduce the rate of feeding a sheet, or of two or more motors, to keep one motor waiting or to reduce the average driving time of the one motor when, for the one motor, the value estimated by the estimation unit exceeds the threshold value.

This image forming apparatus may comprise a fan configured to cool at least one portion of the image forming apparatus, wherein the main controller unit, in response to the request for change of operation mode from the notification unit, may changes operation modes to change a rotation rate of the fan.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A device for controlling a motor mounted on a system with different operation modes, comprising:
a controller unit configured to calculate an input value for the motor based on an output value of the motor and a target value depending on operation modes of the system, and to instruct a driver circuit of the motor to apply the input value to the motor;
an estimation unit configured to estimate an amount of rise in temperature of the motor by applying the input value for the motor to a thermal model of the motor;
a notification unit configured to compare a value estimated by the estimation unit with a threshold value, and when the estimated value exceeds the threshold value, to send a request for change of operation mode to the system,
a detector unit configured to detect a rotation rate of the motor to be used as the output value of the motor, and
a rate control unit configured to calculate the width of a pulse from the difference in rotation rate of the motor between a value detected by the detector unit and the target value depending on operation modes of the system, and to assign the width of the pulse as the input value for the motor, the pulse being to be applied to the motor by the driver circuit of the motor.

2. The device according to claim 1, wherein
the estimation unit includes:
a measuring unit configured to measure a power loss of the motor from a pulse width calculated by the rate control unit; and
a low pass filter configured to integrate power losses of the motor measured by the measuring unit by using the thermal model of the motor to estimate the amount of rise in temperature of the motor.

3. The device according to claim 1, wherein
the estimation unit includes a low pass filter configured to integrate pulse widths calculated by the rate control unit by using the thermal model of the motor to estimate the amount of rise in temperature of the motor.

4. The device according to claim 1, wherein
the estimation unit updates estimation values at longer time intervals than the controller unit updates input values for the motor.

5. The device according to claim 1, wherein
the estimation unit is equipped with two types of the thermal model of the motor, a heating model and a cooling model, and uses the heating model when the input value of the motor or the output value of the motor indicates driving of the motor, and uses the cooling model when the input value of the motor or the output value of the motor indicates stop of the motor.

6. The device according to claim 1, wherein
the operation modes of the system include two or more modes differing in average power loss of the motor; and
the notification unit arranges an order in which the system should change operation modes to reduce the average power loss of the motor stepwise, and instructs the system to change operation modes in the order by sending requests for change of operation mode to the system.

7. An image forming apparatus comprising:
a main controller unit configured to assign an operation mode depending on a job received from a user;
two or more motors configured to be used in transferring a sheet and forming the image on the sheet;
two or more driver circuits configured to supply power to their respective motors of the two or more motors; and
a motor control unit including:
a controller unit configured to calculate input values for the two or more motors based on output values of the two or more motors and target values depending on operation modes of the image forming apparatus, and to instruct the two or more driver circuits to apply the input values to their respective motors;

an estimation unit configured to estimate amounts of rise in temperature of the two or more motors by applying the input values for the two or more motors to a thermal model of the two or more motors; and a notification unit configured to compare a value estimated by the estimation unit with a threshold value, and when the estimated value exceeds the threshold value, to send a request for change of operation mode to the main controller unit.

8. The image forming apparatus according to claim 7, wherein the main controller unit, in response to the request for change of operation mode from the notification unit, selects an operation mode to be changed depending on the length of time before a job currently processed will be finished.

9. The image forming apparatus according to claim 7, wherein the main controller unit, in response to the request for change of operation mode from the notification unit, changes operation modes to enlarge the intervals of feeding sheets.

10. The image forming apparatus according to claim 7, wherein the main controller unit, in response to the request for change of operation mode from the notification unit, changes operation modes to reduce the rate of feeding a sheet.

11. The image forming apparatus according to claim 7, wherein the main controller unit, in response to the request for change of operation mode from the notification unit, changes operation modes to keep one motor of the two or more motors waiting or reduce the average driving time of the one motor when, for the one motor, the value estimated by the estimation unit exceeds the threshold value.

12. The image forming apparatus according to claim 7, further comprising a fan configured to cool at least one portion of the image forming apparatus, wherein the main controller unit, in response to the request for change of operation mode from the notification unit, changes operation modes to change a rotation rate of the fan.

* * * * *